United States Patent
Hueda et al.

(10) Patent No.: US 9,225,433 B1
(45) Date of Patent: Dec. 29, 2015

(54) TIMING RECOVERY FOR OPTICAL COHERENT RECEIVERS IN THE PRESENCE OF POLARIZATION MODE DISPERSION

(75) Inventors: Mario Rafael Hueda, Cordoba (AR); Hugo Santiago Carrer, Mendiolaza (AR); Diego Ernesto Crivelli, Cordoba (AR); Oscar Ernesto Agazzi, Irvine, CA (US); Norman L. Swenson, Mountain View, CA (US)

(73) Assignee: ClariPhy Communications, Inc., Irvine, CA (US)

(*) Notice: Subject to any disclaimer, the term of this patent is extended or adjusted under 35 U.S.C. 154(b) by 137 days.

(21) Appl. No.: 13/594,644

(22) Filed: Aug. 24, 2012

Related U.S. Application Data

(60) Provisional application No. 61/676,943, filed on Jul. 28, 2012, provisional application No. 61/527,013, filed on Aug. 24, 2011.

(51) Int. Cl.
*H04B 10/06* (2006.01)
*H04B 10/61* (2013.01)

(52) U.S. Cl.
CPC ........ *H04B 10/6162* (2013.01); *H04B 10/6164* (2013.01); *H04B 10/6165* (2013.01)

(58) Field of Classification Search
CPC ................. H04B 10/60–10/64; H04J 14/06
See application file for complete search history.

(56) References Cited

U.S. PATENT DOCUMENTS

| | | | | |
|---|---|---|---|---|
| 4,669,116 | A * | 5/1987 | Agazzi et al. | 379/406.08 |
| 7,894,728 | B1 * | 2/2011 | Sun et al. | 398/208 |
| 8,244,142 | B2 * | 8/2012 | Wagner et al. | 398/208 |
| 8,634,726 | B2 * | 1/2014 | Zhang et al. | 398/208 |
| 8,655,191 | B2 * | 2/2014 | Kaneda et al. | 398/205 |
| 8,712,247 | B2 * | 4/2014 | Hauske | 398/155 |
| 2006/0013590 | A1 * | 1/2006 | Hueda et al. | 398/149 |
| 2009/0252497 | A1 * | 10/2009 | Younce et al. | 398/81 |
| 2010/0329677 | A1 * | 12/2010 | Kaneda et al. | 398/65 |
| 2011/0268459 | A1 * | 11/2011 | Rollins et al. | 398/208 |
| 2012/0096061 | A1 * | 4/2012 | Hauske | 708/319 |
| 2012/0177156 | A1 * | 7/2012 | Hauske et al. | 375/343 |
| 2012/0213510 | A1 * | 8/2012 | Stojanovic | 398/25 |
| 2012/0219302 | A1 * | 8/2012 | Sun et al. | 398/208 |
| 2012/0269513 | A1 * | 10/2012 | Abe | 398/65 |
| 2012/0288275 | A1 * | 11/2012 | Zhang et al. | 398/25 |
| 2013/0039665 | A1 * | 2/2013 | Hauske | 398/202 |
| 2013/0336647 | A1 * | 12/2013 | Le Taillandier De Gabory et al. | 398/25 |

OTHER PUBLICATIONS

Moon et al: "Timing Recovery in CMOS using Nonlinear Spectral-line Method", IEEE 1996 Custom Integrated Circuits Conference, 1996, pp. 13-16.*

(Continued)

*Primary Examiner* — Li Liu
(74) *Attorney, Agent, or Firm* — Fenwick & West LLP

(57) ABSTRACT

A receiver architecture and method performs timing recovery in the presence of differential group delay (DGD) (caused, for example, by polarization mode dispersion). A matrix-based linear transformation is applied to the polarization components of a signal received over the optical fiber channel that mitigates or eliminates the effects of the differential group delay. Timing recovery can then be performed on the transformed signal to recover a clock signal. Beneficially, the described technique can recover timing information even in half-baud DGD channels. Furthermore, latency and computational load can be minimized.

24 Claims, 12 Drawing Sheets

(56) References Cited

OTHER PUBLICATIONS

Agazzi, O., et al., "Maximum-Likelihood Sequence Estimation in Dispersive Optical Channels," Journal of Lightwave Technology, vol. 23, No. 2, pp. 749-763, Feb. 2005.

Agazzi, O., et al., "Timing Recovery in Digital Subscriber Loops," IEEE Transactions on Communications, vol. COM-33, No. 6, pp. 558-569, Jun. 1985.

Crivelli, D.E., et al., "Adaptive Digital Equalization in the Presence of Chromatic Dispersion, PMD, and Phase Noise in Coherent Fiber Optic Systems," in IEEE 2004 Global Telecommunications Conference, Nov. 29-Dec. 3, 2004, vol. 4, pp. 2545-2551.

Kuschnerov, M., et al., "DSP for Coherent Single-Carrier Receivers," Journal of Lightwave Technology, vol. 27, No. 16, pp. 3614-3622, Aug. 15, 2009.

* cited by examiner

TIMING RECOVERY FOR OPTICAL COHERENT RECEIVERS IN THE PRESENCE OF POLARIZATION MODE DISPERSION

RELATED APPLICATIONS

This application claims priority under 35 U.S.C. §119(e) to U.S. Provisional Patent Application Ser. No. 61/527,013 entitled "Timing Recovery for Optical Coherent Receiver in the Presence of PMD" filed Aug. 24, 2011 to Mario R. Hueda, et al. and to U.S. Provisional Patent Application Ser. No. 61/676,943 entitled "Timing Recovery for Optical Coherent Receivers in the Presence of Polarization Mode Dispersion (PMD)," filed on Jul. 28, 2012 to Mario R. Hueda, et al., the content of which are each incorporated by reference herein.

BACKGROUND

1. Field of the Art

The disclosure relates generally to communication systems, and more specifically, to timing recovery in an optical receiver.

2. Description of the Related Art

The most recent generation of high-speed optical transport network systems has widely adopted receiver technologies with electronic dispersion compensation (EDC). In coherent as well as in intensity modulation direct detection (IM-DD) receivers, EDC mitigates fiber impairments such as chromatic dispersion (CD) and polarization mode dispersion (PMD).

Timing recovery (TR) in the presence of differential group delay (DGD) has been identified as one of the most critical challenges for intradyne coherent receivers. In particular, it has been shown that timing information can be completely lost in optical channels with half-baud (or half-symbol period) DGD. This can result in the receiver failing to recover data received over the fiber channel, thereby decreasing performance of the optical network system.

SUMMARY

A receiver processes a signal received over an optical communication channel. The signal includes first and second polarization components and the optical communication channel introduces polarization mode dispersion effects into the signal. In one embodiment, the receiver comprises an analog front end to sample the signal based on a sampling clock to generate digital vector representing the first and second polarization components of the signal. A matrix transformation block applies a transformation matrix (which in one embodiment, comprises a rotation matrix) to the digital vector representing the first and second polarization components to generate a transformed digital vector such that the tone energy of the transformed digital vector is increased relative to the timing tone energy of the received digital vector when the timing tone energy is based on a memoryless nonlinearity of one of the first and second polarization components of the transformed digital vector. A timing recovery block detects a symbol rate of the transformed digital vector and generates the sampling clock based on the detected symbol rate.

In one embodiment, the optical signal comprises a half symbol period differential group delay for at least a portion of the optical signal. The analog front end samples the signal based on a sampling clock to generate a digital vector representing first and second polarization components. A digital signal processor executes instructions for timing recovery. The digital signal process generates a sampling clock based on a detected symbol rate in the digital vector. The sampling clock achieves a non-zero timing tone energy for the portion of the optical signal having the half symbol period differential group delay.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

Overview

A receiver architecture and method for timing recovery is described for transmissions received over an optical fiber channel in the presence of differential group delay (DGD) (caused, for example, by polarization mode dispersion). A matrix-based linear transformation is applied to the vector of polarization components of a signal received over the optical fiber channel that mitigates or eliminates the effects of the differential group delay on timing recovery. Timing recovery can then be performed on the transformed signal to recover a clock signal. Beneficially, the described technique can recover timing information even in half-baud DGD channels. Furthermore, latency and computational load can be minimized with the described timing recovery technique.

High Level System Architecture

Figure 1:
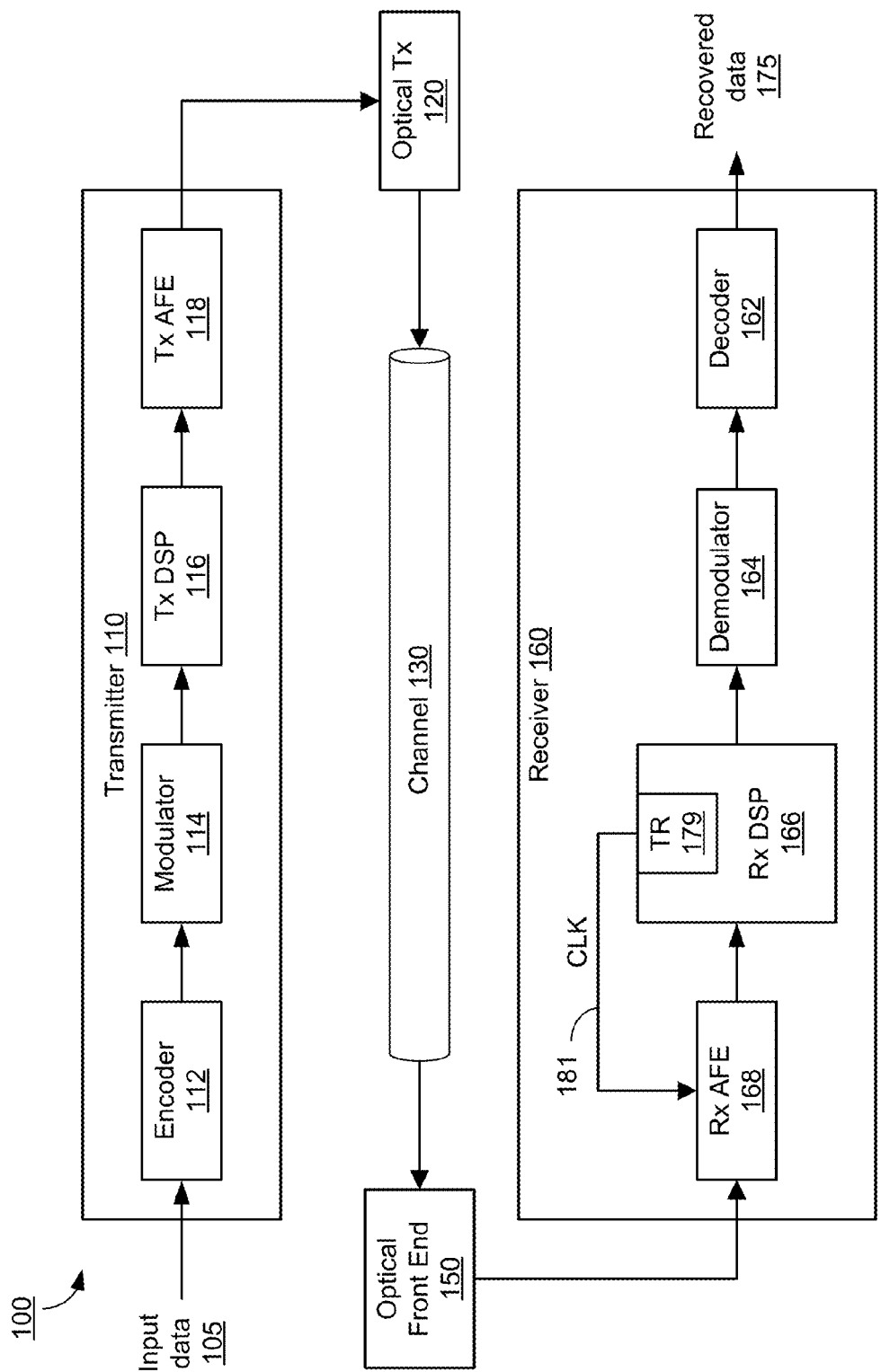
FIG. 1 is a system diagram of an embodiment of an optical communication system.

FIG. 1 is a block diagram of a communication system 100. The communication system 100 comprises a transmitter 110 for encoding data as an electrical signal, an optical transmitter 120 for converting the electrical signal produced by the transmitter 110 to an optical signal suitable for transmission over a communication channel 130, an optical front end 150 for converting the received optical signal to an electrical signal, and a receiver for receiving and processing the electrical signal encoding the data from the optical front end 150. In one embodiment, the communication system 100 comprises an ultra-high speed (e.g., 40 Gb/s or faster) optical fiber communication system, although the described techniques may also be applicable to lower speed optical communication systems.

The transmitter 110 comprises an encoder 112, a modulator 114, a transmitter (Tx) digital signal processor (DSP) 116, and Tx analog front end (AFE) 118. The encoder 112 receives input data 105 and encodes the data for transmission over the optical network. For example, in one embodiment, the encoder 112 encodes the input data 105 using forward error correction (FEC) codes that will enable the receiver 160 to detect, and in many cases, correct errors in the data received over the channel 130. The modulator 114 modulates the encoded data via one or more carrier signals for transmission over the channel 130. For example, in one embodiment, the modulator 114 applies phase-shift keying (PSK) or different phase-shift keying (DPSK) to the encoded data. The Tx DSP 116 adapts (by filtering, etc.) the modulator's output signal according to the channel characteristics in order to improve the overall performance of the transmitter 110. The Tx AFE 118 further processes and converts the Tx DSP's digital output signal to the analog domain before it is passed to the optical transmitter (Optical Tx) 120 where it is converted to an optical signal and transmitted via the channel 130. One example of the optical transmitter 120 transmits independent modulations on both polarizations of the optical carrier. An example modulation is QPSK, though other modulations can be used, and the choice can be made to transmit on either one or both polarizations.

In addition to the illustrated components, the transmitter 110 may comprise other conventional features of a transmitter 110 which are omitted from FIG. 1 for clarity of description. Furthermore, in one embodiment, the transmitter 110 is embodied as a portion of a transceiver device that can both transmit and receive over the channel 130.

The channel 130 may have a limited frequency bandwidth and may act as a filter on the transmitted data. Transmission over the channel 130 may add noise to the transmitted signal including various types of random disturbances arising from outside or within the communication system 100. Furthermore, the channel 130 may introduce fading and/or attenuation effects to the transmitted data. Additionally, the channel 130 may introduce chromatic dispersion (CD) and polarization mode dispersion (PMD) effects that cause a spreading of pulses in the channel 130. Based on these imperfections in the channel 130, the receiver 160 is designed to process the received data and recover the input data 105.

In general, the optical front end 150 receives the optical signal, converts the optical signal to an electrical signal, and passes the electrical signal to the receiver 160. The receiver 160 receives the encoded and modulated data from the transmitter 110 via the optical transmitter 120, communication channel 130, and optical front end 150, and produces recovered data 175 representative of the input data 105. The receiver 160 includes a receiver (Rx) analog front end (AFE) 168, an RX DSP 166, a demodulator 164, and a decoder 162.

The Rx AFE 168 samples the analog signal from the optical front end 150 based on a clock signal 181 to convert the signal to the digital domain. The Rx DSP 166 further processes the digital signal by applying one or more filters to improve signal quality. As will be discussed in further detail below, the Rx DSP 166 includes a timing recovery block 179 that operates to generate the sampling clock 181 and to adjust the sampling frequency and phase of the sampling clock signal 181 to ensure that the sampling clock remains synchronized with the symbol rate and phase of the incoming optical signal. This timing recovery problem becomes challenging due to the imperfections in the channel 130 that may alter the received optical signal. For example, chromatic dispersion (CD) and polarization mode dispersion (PMD) effects may cause a spreading of pulses in the channel 130, thereby increasing the difficulty of timing recovery, as will be explained below.

The demodulator 164 receives the modulated signal from the Rx DSP 166 and demodulates the signal. The decoder 162 decodes the demodulated signal (e.g., using error correction codes) to recover the original input data 105.

Embodiments of the receiver may operate to process data modulated on both polarizations of the optical signal (e.g., using dual polarization modulation), or alternatively, the receiver may operate to process data modulated on only one of the polarizations. Although the operation of the receiver below focuses on a signal transmitted on both polarizations, it will be apparent to one of ordinary skill in the art that the described operation could be similarly adapted to transmitters/receivers that modulate data on only one polarization.

In addition to the illustrated components, the receiver 160 may comprise other conventional features of a receiver 160 which are omitted from FIG. 1 for clarity of description. Furthermore, in one embodiment, the receiver 160 is embodied as a portion of a transceiver device that can both transmit and receive over the channel 130.

Components of the transmitter 110 and the receiver 160 described herein may be implemented, for example, as an integrated circuit (e.g., an Application-Specific Integrated Circuit (ASIC) or using a field-programmable gate array (FPGA), in software (e.g., loading program instructions to a processor (e.g., a digital signal processor (DSP)) from a computer-readable storage medium and executing the instructions by the processor), or by a combination of hardware and software.

Impact of DGD on Timing Recovery

This section explains how the PMD is expressed mathematically, which provides a basis for an explanation of the effects of particular PMD on the timing information in the received signal. Particular examples are presented which show that the timing information can disappear completely for certain PMD situations. Two different situations are examined: the first is when the timing recovery is based on a single polarization at the receiver, and the second is when timing recovery is based on both polarizations at the receiver. The signal from the optical front end 150 presented to the receiver 160 consists of electrical signals from both polarizations of the optical signal received by the optical front end 150. These two polarizations can be treated mathematically as a two-dimensional complex vector, where each component corresponds to one of the polarizations of the received optical signal. Alternatively, the two polarizations can be treated mathematically as a four-dimensional real vector, where two of the dimensions correspond to the in-phase and quadrature components of one polarization, and the other two components correspond to the in-phase and quadrature components of the other polarization. Without loss of generality, the analysis below treats the signal as a two-dimensional complex vector.

This example demonstrates the embodiment where the two polarizations at the transmitter are each modulated independently. Let $\{a_k\}$ and $\{b_k\}$ respectively represent the symbol sequences transmitted on the horizontal and vertical polarizations of the optical signal, where the symbols are in general complex. For this example, it is assumed that $a_k$ and $b_k$ are independent and identically distributed complex data symbols with $E\{a_k a^*_m\}=E\{b_k b^*_m\}=\delta_{m-k}$ where $\delta_k$ is the discrete time impulse function and $E\{\cdot\}$ denotes expected value. Let $X(\omega)$ be the Fourier transform of the channel input $$\sum_k \begin{bmatrix} a_k \\ b_k \end{bmatrix} \delta(t - kT),$$

where $\delta(t)$ is the continuous time impulse function (or delta function), and T is the symbol period (also called one baud). Let $S(\omega)$ be the Fourier transform of the transmit pulse, s(t). In the presence of CD and PMD, the channel output can be written as $H(\omega)X(\omega)$, with the channel transfer matrix expressed as $$H(\omega) = e^{-j\beta(\omega)L} J(\omega) S(\omega), \quad (1)$$

where $\omega$ is the angular frequency, L is the fiber length of the optical channel 130, $\beta(\omega)$ is the CD parameter, $$S(\omega) = \begin{bmatrix} S(\omega) & 0 \\ 0 & S(\omega) \end{bmatrix}, \quad (2)$$

and $J(\omega)$ is the Jones matrix. The components of $J(\omega)$ are defined by $$J(\omega) = \begin{bmatrix} U(\omega) & V(\omega) \\ -V^*(\omega) & U^*(\omega) \end{bmatrix}, \quad (3)$$

where * denotes complex conjugate. Matrix $J(\omega)$ is special unitary (i.e., $J(\omega)^\dagger J(\omega)=I$, $\det(J(\omega))=1$, where I is the 2×2 identity matrix and † denotes conjugate transpose) and models the effects of the PMD. For example, the Jones matrix for first-order PMD reduces to $$J(\omega) = R(\theta_0 \phi_0) \begin{bmatrix} e^{j\omega\frac{\tau}{2}+j\frac{\psi_0}{2}} & 0 \\ 0 & e^{-j\omega\frac{\tau}{2}-j\frac{\psi_0}{2}} \end{bmatrix} \quad (4)$$

where $\tau$ is the differential group delay (DGD), $\psi_0$ is the polarization phase, and $R(\cdot,\cdot)$ is the rotation matrix given by $$R(\theta, \phi) = \begin{bmatrix} e^{j\frac{\phi}{2}} & 0 \\ 0 & e^{-j\frac{\phi}{2}} \end{bmatrix} \begin{bmatrix} \cos(\theta) & \sin(\theta) \\ -\sin(\theta) & \cos(\theta) \end{bmatrix} \quad (5a)$$

where $\theta$ is the polarization angle and $\Phi$ is a random phase angle. Note that first order DGD may be more generally expressed as:

$$R(\theta_0 \phi_0) \begin{bmatrix} e^{j\omega\frac{\tau}{2}+j\frac{\psi_0}{2}} & 0 \\ 0 & e^{-j\omega\frac{\tau}{2}-j\frac{\psi_0}{2}} \end{bmatrix} R^{-1}(\theta_1 \phi_1) \quad (5b)$$

but the last rotation matrix does not affect the strength of the timing tone, so the simpler form given in (4) is used herein.

Assuming that CD is completely compensated in the receiver Rx DSP 166 of the receiver 160 or prior to the signal reaching the receiver Rx DSP 166, (i.e., $H(\omega)=J(\omega)S(\omega)$), the noiseless signal entering the timing recovery block 179 can be expressed as:

$$r(t) = \begin{bmatrix} r_x(t) \\ r_y(t) \end{bmatrix} = \begin{bmatrix} \sum_{k=-\infty}^{\infty} h_{11}(t-kT)a_k + h_{12}(t-kT)b_k \\ \sum_{k=-\infty}^{\infty} h_{21}(t-kT)a_k + h_{22}(t-kT)b_k \end{bmatrix}, \quad (6)$$

where 1/T is the symbol rate, while $$h_{11}(t)=F^{-1}\{U(\omega)S(\omega)\}, \quad h_{12}(t)=F^{-1}\{V(\omega)S(\omega)\},$$
$$h_{21}(t)=F^{-1}\{-V^*(\omega)S(\omega)\}, \quad h_{22}(t)=F^{-1}\{U^*(\omega)S(\omega)\}), \quad (7)$$

where $F^{-1}\{\cdot\}$ denotes the inverse Fourier transform.

Although other timing recovery methods may be used, in one example, the timing recovery block 179 applies a "non-linear spectral line method" for timing recovery, as commonly used in oversampled receivers. In this scheme, the timing recovery block 179 processes the received signal by a memoryless nonlinearity in order to generate a timing tone with frequency 1/T. Furthermore, although other variations are possible, in one example, the timing recovery block 179 uses a "magnitude squared nonlinearity" as the memoryless nonlinearity applied to the received signal. Then, the mean value of the magnitude squared of the received signal is periodic with period T and can be expressed through a Fourier series as $$E\{|r_x(t)|^2\} = \frac{1}{\pi T} \sum_{k=0}^{\infty} \text{Re}\left\{z_{x,k} e^{j\frac{2\pi k t}{T}}\right\}, \quad (8)$$

$$E\{|r_y(t)|^2\} = \frac{1}{\pi T} \sum_{k=0}^{\infty} \text{Re}\left\{z_{y,k} e^{j\frac{2\pi k t}{T}}\right\}, \quad (9)$$

where $$z_{x,k} = \int_{-\infty}^{\infty} U(\omega)U^*\left(\omega - \frac{2\pi k}{T}\right)S(\omega)S^*\left(\omega - \frac{2\pi k}{T}\right)d\omega + \quad (10)$$

-continued $$\int_{-\infty}^{\infty} V(\omega)V^*\left(\omega - \frac{2\pi k}{T}\right)S(\omega)S^*\left(\omega - \frac{2\pi k}{T}\right)d\omega$$

$$z_{y,k} = \int_{-\infty}^{\infty} V^*(\omega)V\left(\omega - \frac{2\pi k}{T}\right)S(\omega)S^*\left(\omega - \frac{2\pi k}{T}\right)d\omega + \int_{-\infty}^{\infty} U^*(\omega)U\left(\omega - \frac{2\pi k}{T}\right)S(\omega)S^*\left(\omega - \frac{2\pi k}{T}\right)d\omega. \quad (11)$$

The timing information can be extracted either from the periodic signal derived from the received x polarization ($E\{|r_x(t)|^2\}$), or from the periodic signal derived from the received y polarization ($E\{|r_y(t)|^2\}$), or from some combination of these two periodic signals. Additional details regarding the nonlinear spectral line method for timing recovery is described in J. R. Barry, E. A. Lee, and D. G. Messerschmitt, Digital Communication. KAP, third ed. 2004 which is incorporated by reference herein.

Timing Information Using One Polarization

The following description explains the effects of PMD when one polarization is used for timing recovery and gives example conditions where the timing recovery information can disappear. From (8)-(9), it can be seen that the clock signal 181 will be different from zero in $|r_x(t)|^2$ (or $|r_y(t)|^2$) if the magnitude of the Fourier coefficient $|z_{x,1}|>0$ (or $|z_{y,1}|>0$). On the other hand, from (10) and (11) it can be verified that the timing tone in each polarization component will be zero if $$V(\omega) = e^{j\psi}e^{\pm j\omega\frac{T}{2}}U(\omega), \quad (12)$$

where $\psi$ is an arbitrary phase. Since the Jones matrix is unitary (i.e., $|U(\omega)|^2+|V(\omega)|^2=1$), the following expression can be derived from (12)

$$|U(\omega)| = |V(\omega)| = \frac{1}{\sqrt{2}}. \quad (13)$$

Let $\gamma(\omega)/2$ be the phase response of $U(\omega)$. Then, from (12) and (13), the clock signal disappears when the Jones matrix representing the PMD at the input of the timing recovery block 179 can be expressed as $$J_0(\omega) = \begin{bmatrix} \frac{1}{\sqrt{2}}e^{j\frac{\gamma(\omega)}{2}} & \frac{1}{\sqrt{2}}e^{j\frac{\gamma(\omega)}{2}} \\ -\frac{1}{\sqrt{2}}e^{-j\frac{\gamma(\omega)}{2}} & \frac{1}{\sqrt{2}}e^{-j\frac{\gamma(\omega)}{2}} \end{bmatrix} \begin{bmatrix} e^{\pm j\omega\frac{T}{4}+j\frac{\psi}{2}} & 0 \\ 0 & e^{\mp j\omega\frac{T}{4}-j\frac{\psi}{2}} \end{bmatrix} = \quad (14)$$

$$R(\pi/4, \gamma(\omega)) \begin{bmatrix} e^{\pm j\omega\frac{T}{4}+j\frac{\psi}{2}} & 0 \\ 0 & e^{\mp j\omega\frac{T}{4}-j\frac{\psi}{2}} \end{bmatrix}.$$

Figure 2:
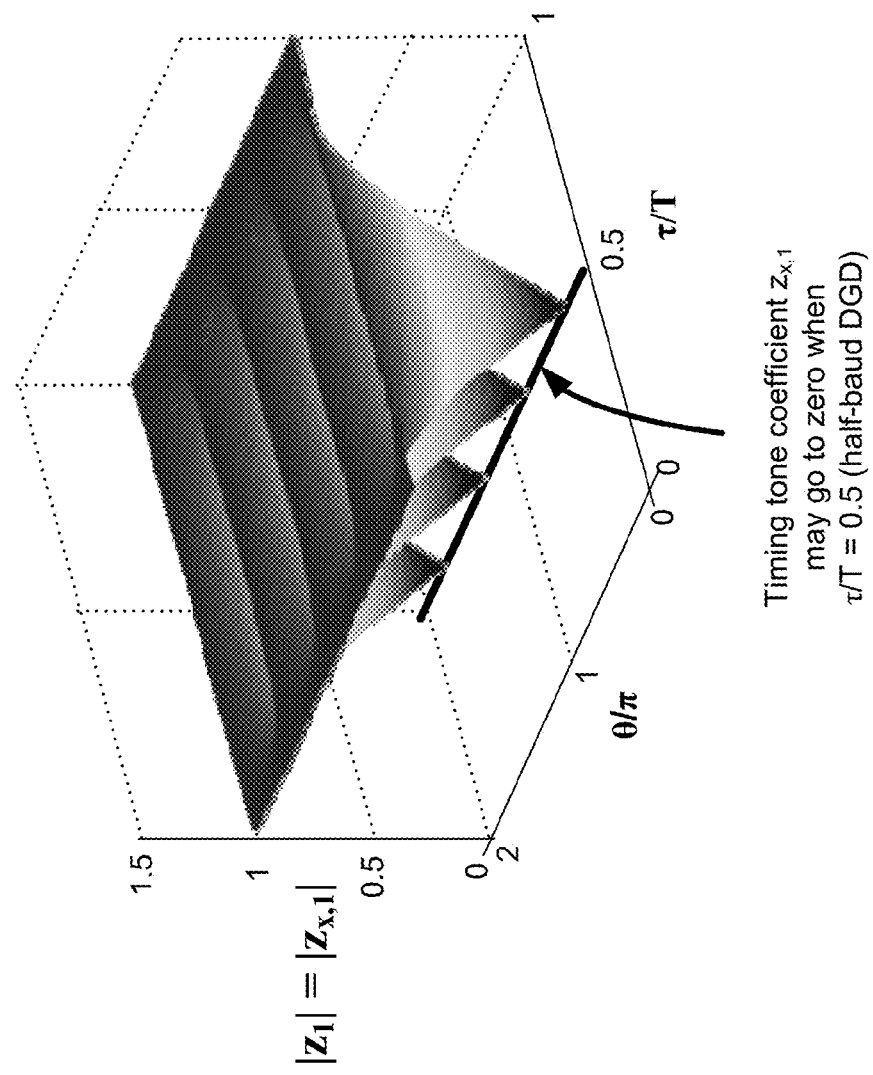
FIG. 2 is a plot illustrating an effect of half baud DGD in an uncompensated optical receiver where a single polarization is used for timing recovery.

For example, the impact of the first-order PMD defined by (4) is analyzed in FIG. 2. Here, the plot illustrates the normalized magnitude of the timing tone coefficient $z_{x,1}$ derived from (10), versus DGD ($\tau$) and the rotation angle ($\theta$) assuming an ideal lowpass pulse s(t) with bandwidth excess <100%. In particular, for $\tau=T/2$, and $\theta_0=\pi/4$, the following expression can be derived from (4):

$$J(\omega) = R(\pi/4, \phi_0) \begin{bmatrix} e^{j\omega\frac{T}{4}+j\frac{\psi_0}{2}} & 0 \\ 0 & e^{-j\omega\frac{T}{4}-j\frac{\psi_0}{2}} \end{bmatrix}. \quad (15)$$

The matrix in (15) can be written as (14) (with $\gamma(\omega)=\Phi_0$ and $\psi=\psi_0$). It can be inferred from the equations above that the clock signal may disappear with half-baud DGD, as illustrated in FIG. 2.

Timing Information Using Two Polarizations

The effects of PMD are now described when both polarizations are used for timing recovery and conditions where the timing recovery information can disappear are presented. In particular, the sum of the squared signals of both polarizations may be used for timing recovery (i.e., $|r_x(t)|^2+|r_y(t)|^2$). Then, the total timing tone coefficient $z_{x+y,1}$ can be expressed as:

$$z_{x+y,1} = \quad (16)$$

$$z_{x,1} + z_{y,1} = \int_{-\infty}^{\infty} 2\Re\left\{U(\omega)U^*\left(\omega - \frac{2\pi}{T}\right)\right\}S(\omega)S^*\left(\omega - \frac{2\pi}{T}\right)d\omega + \int_{-\infty}^{\infty} 2\Re\left\{V(\omega)V^*\left(\omega - \frac{2\pi}{T}\right)\right\}S(\omega)S^*\left(\omega - \frac{2\pi}{T}\right)d\omega,$$

where $\Re\{\bullet\}$ denotes the real part of the expression.

Figure 3:
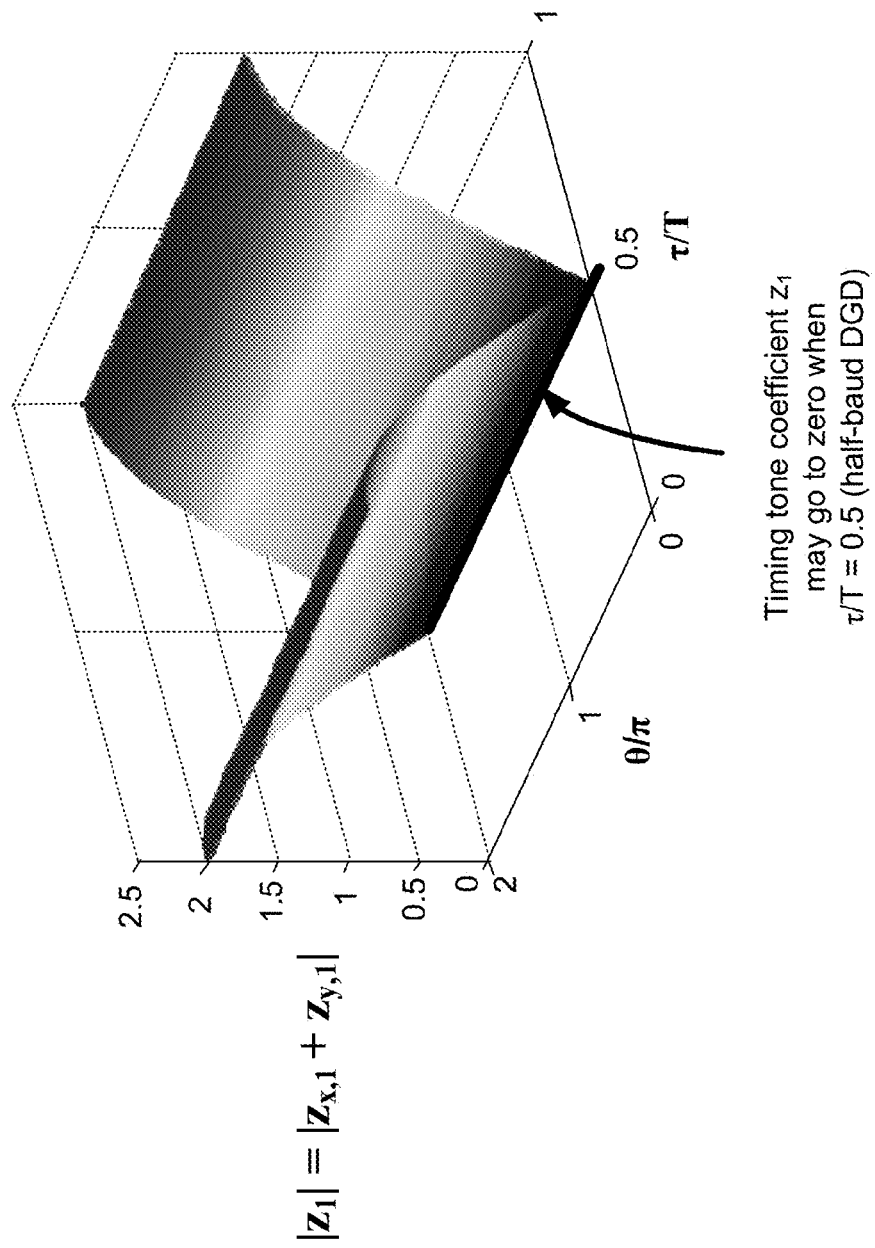
FIG. 3 is a plot illustrating an effect of half baud DGD in an uncompensated optical receiver where two polarizations are used for timing recovery.

For example, from (16) it is observed that the clock signal will be zero if $$U(\omega) = |U(\omega)|e^{\pm j\omega\frac{T}{4}}e^{j\frac{\varphi_U}{2}} \text{ and } V(\omega) = |V(\omega)|e^{\pm j\omega\frac{T}{4}}e^{j\frac{\varphi_V}{2}}, \quad (17)$$

where $\psi_U$ and $\psi_V$ are arbitrary angles. As can be seen, the first-order PMD defined by (4) with $\tau=T/2$ satisfies condition (17) for any combination of $\theta_0$, $\Phi_0$ and $\psi_0$. Therefore, the clock signal contained in $|r_x(t)|^2+|r_y(t)|^2$ is lost in the presence of half-baud DGD. This is illustrated in FIG. 3, which is a plot of the normalized timing tone magnitude in $|r_x(t)|^2+|r_y(t)|^2$ versus DGD ($\tau$) and the rotation angle ($\theta$).

General Approach to Timing Recovery in PMD Channels

The operating principles of the Rx DSP 166 are now described in further detail. A general approach to mitigate the timing recovery problem is to equalize the higher-order PMD (represented by a non-constant $\gamma(\omega)$ in (14)) leaving only first order PMD, and de-rotating the received signal so that the fast and slow PMD axes correspond to the polarization axes at the receiver 160. This corresponds to inverting the matrix R ($\theta_0$, $\gamma(\omega)$) in (14).

As shown before, the timing tone in clock signal 181 can be lost if the PMD matrix can be expressed as:

$$J(\omega) = \begin{bmatrix} U(\omega) & V(\omega) \\ -V^*(\omega) & U^*(\omega) \end{bmatrix} = R(\theta_0, \gamma(\omega)) \begin{bmatrix} e^{\pm j\omega\frac{\tau}{2}+j\frac{\psi}{2}} & 0 \\ 0 & e^{\mp j\omega\frac{\tau}{2}-j\frac{\psi}{2}} \end{bmatrix}.$$

Thus, to mitigate this problem, an equalizer can be used before the timing recovery block 179 of the receiver 160 with transfer matrix $H_{TR}(\omega)=R^{-1}(\theta_0, \gamma(\omega))$. This way, the Jones matrix at the input of timing recovery block 179 is:

$$\bar{J}(\omega) = R^{-1}(\theta_0, \gamma(\omega))J(\omega) = \begin{bmatrix} e^{j\omega\frac{\tau}{2}+j\frac{\psi}{2}} & 0 \\ 0 & e^{-j\omega\frac{\tau}{2}-j\frac{\psi}{2}} \end{bmatrix}. \quad (18)$$

Based on (10) and (18), the timing tone complex coefficient results in $$\bar{z}_{x,1} = e^{j\pi\frac{\tau}{T}} \int_{-\infty}^{\infty} S(\omega)S^*\left(\omega - \frac{2\pi}{T}\right)d\omega. \quad (19)$$

From (19), it can be seen that for a given transmit pulse s(t), the timing tone magnitude $|\bar{z}_{x,1}|$ is maximum and independent of the PMD parameters. Therefore, the effect of the PMD on the timing tone energy is completely eliminated. Note that this general approach involves calculation of the matrix equalizer $H_{TR}(\omega)$ which is a function of frequency, meaning that the transformation is not memoryless.

Reduced Complexity Approach to Timing Recovery

A more efficient approach to timing recovery is now described. Without substantial loss of performance, the equalizing matrix $H_{TR}(\omega)$ can be made independent of frequency, so that it is a simple memoryless rotation matrix. It is possible to show that the timing tone coefficients for each polarization (i.e., $z_{x,1}$ and $z_{y,1}$) are given by the diagonal elements of the 2×2 matrix $$Z = \begin{bmatrix} z_{x,1} & z_{xy} \\ z_{yx} & z_{y,1} \end{bmatrix} = \int S(\omega)S^H\left\{\omega - \frac{2\pi}{T}\right\}J(\omega)J^H\left\{\omega - \frac{2\pi}{T}\right\}d\omega$$

In the following, it is assumed that SOPMD is the dominant component of PMD. In this case, the PMD Jones matrix can be written as (i.e., the Bruyere model)

$$J(\omega) \approx R\left(\frac{p_\omega \omega}{4}, 0\right)\begin{bmatrix} e^{j\omega\tau/2} & 0 \\ 0 & e^{-j\omega\tau/2} \end{bmatrix}R^{-1}\left(\frac{p_\omega \omega}{4}, 0\right)$$

where $p_\omega$ is the depolarization rate of the principle state of polarization (PSP) (for simplicity, the polarization dependent chromatic dispersion (PCD) component is neglected). Next it is shown that a simple matrix rotator at the input of the timing recovery block 179 is a good approach to provide a good timing tone level at a given polarization (i.e., $z_{x,1}$ or $z_{y,1}$) in the presence of DGD and SOPMD channels. Based on this finding, an algorithm is described to compute the proper angles to generate such a matrix rotator.

In the case that the bandwidth excess of the pulse s(t) is low (e.g., ≤50%), then the product $$S(\omega)S^*\left(\omega - \frac{2\pi}{T}\right)$$

is concentrated around $$\omega = \frac{\pi}{T},$$

i.e., $$K_s = \int_{-\infty}^{\infty} S(\omega)S^*\left(\omega - \frac{2\pi}{T}\right)d\omega \approx \int_{\frac{\pi}{T}-\Delta\omega}^{\frac{\pi}{T}+\Delta\omega} S(\omega)S^*\left(\omega - \frac{2\pi}{T}\right)d\omega, \quad (20)$$

$$\Delta\omega > 0.$$

Note that $|K_s|$ is the magnitude of the timing tone coefficient for each polarization in the absence of channel dispersion.

For $\Delta\omega$ sufficiently small and moderate PMD, the following approximation can be made:

$$J(\omega) \approx \qquad (21)$$

$$R\left(\frac{p_\omega \pi}{4T}, 0\right)\begin{bmatrix} e^{j\omega\tau/2} & 0 \\ 0 & e^{-j\omega\tau/2} \end{bmatrix}R^{-1}\left(\frac{p_\omega \pi}{4T}, 0\right)\frac{\pi}{T} - \Delta\omega < \omega < \frac{\pi}{T} + \Delta\omega.$$

$$J\left(\omega - \frac{2\pi}{T}\right) \approx R\left(-\frac{p_\omega \pi}{4T}, 0\right)\begin{bmatrix} e^{j\omega\tau/2} & 0 \\ 0 & e^{-j\omega\tau/2} \end{bmatrix}R^{-1}\left(-\frac{p_\omega \pi}{4T}, 0\right)\frac{\pi}{T} - \Delta\omega <$$

$$\omega < \frac{\pi}{T} + \Delta\omega$$

Then, it is possible to show that matrix Z reduces to $$Z \approx K_S Z_1 \qquad (22a)$$

with $$Z_1 = R(\theta_0, \Phi_0)PR^{-1}(\theta_0, \Phi_0) \qquad (22b)$$

where P is a special unitary matrix, while $\theta_0$ and $\phi_0$ are certain angles.

Since matrix $Z_1$ is also special unitary, it can be expressed as $$Z_1 = R(\theta_1, \Phi_1)\Lambda R^{-1}(\theta_1, \Phi_1) \qquad (22c)$$

where $\Lambda$ is a special unitary diagonal matrix.

If the transfer matrix at the timing recovery input is $$H_{TR}(\omega) = M(\theta_1, \Phi_1) = R^H(\theta_1, \Phi_1) \qquad (23a)$$

and taking into account that $$M(\theta_1, \phi_1)R(\theta_1, \phi_1) = \begin{bmatrix} 1 & 0 \\ 0 & 1 \end{bmatrix} \qquad (23b)$$

it is possible to show that $$Z = \begin{bmatrix} \tilde{z}_{x,1} & \tilde{z}_{xy} \\ \tilde{z}_{yx} & \tilde{z}_{y,1} \end{bmatrix} \approx K_S \Lambda \qquad (24)$$

Since the diagonal matrix $\Lambda$ is unitary, it is observed that the magnitudes of the timing tone coefficients for both polarizations are $$\tilde{z}_{x,1} = \tilde{z}_{y,1} \approx |K_s| \qquad (25)$$

Therefore the impact of the DGD and SOPMD on the timing tone energy is mitigated. From the above, it can be inferred that a simple matrix rotator at the input of the timing recovery block 179 is a good approach to provide a good timing tone level at a given polarization in the presence of DGD and SOPMD channels.

Estimating Parameters of Rotation Matrix

It is shown above that the equalizer for timing recovery can be approximated by a simple time-varying matrix transformation (e.g., a simple memoryless rotation matrix M, as in (23a)). A method is now described to compute the components of the rotation matrix M. By observing the channel response $H(\omega)$, the effect on the timing tone can be computed by applying a rotation matrix M. In general, $H(\omega)$ is not precisely known, but it can be approximated based on an equalizer response as described below. While matrix M is generally referred to herein as a rotation matrix for consistency with the example mathematical explanation described, this matrix M may comprise a more general transformation matrix in some embodiments. For example, in one embodiment, the matrix M may have the general form of (5a), in which both an angle and phase term are introduced, or its conjugate transpose as in (23a), or a more general rotation as in $$\begin{bmatrix} e^{j\frac{\phi}{2}} & 0 \\ 0 & e^{-j\frac{\phi}{2}} \end{bmatrix} \begin{bmatrix} \cos(\theta) & \sin(\theta) \\ -\sin(\theta) & \cos(\theta) \end{bmatrix} \begin{bmatrix} e^{j\frac{\xi}{2}} & 0 \\ 0 & e^{-j\frac{\xi}{2}} \end{bmatrix}$$

in which both an angle and two phase terms are introduced. In other embodiments, a transformation matrix having a different form may be used as matrix M.

In one embodiment described below, matrix M comprises rotation matrix with respective angle and phase parameters $\theta, \Phi$. These parameters of the rotation matrix M can be estimated according to the following technique. Let $\tilde{H}(\omega)$ be the channel transfer matrix at the output of a linear transformation with a generic rotation matrix $M(\tilde{\theta},\tilde{\Phi})=R^H(\tilde{\theta},\tilde{\Phi})$, i.e., $$\tilde{H}(\omega) = \quad (26)$$

$$M(\tilde{\theta}, \tilde{\phi})H(\omega) = M(\tilde{\theta}, \tilde{\phi})J(\omega)S(\omega) = \begin{bmatrix} \tilde{U}(\omega) & \tilde{V}(\omega) \\ -\tilde{V}*(\omega) & \tilde{U}*(\omega) \end{bmatrix} S(\omega),$$

with $H(\omega)$ given by (1) and $S(\omega)$ given by (2) (again assuming that the CD is completely compensated as described above). Since the timing tone level is maximum at the optimal values of $\tilde{\theta}$ and $\tilde{\Phi}$, their estimation can be achieved by maximizing the clock signal energy, that is, $$(\hat{\theta}_{op}, \hat{\phi}_{op},) = \max_{(\tilde{\theta},\tilde{\phi})} |\tilde{z}_{x,1}(\tilde{\theta}, \tilde{\phi})|^2, \quad (27)$$

where $\tilde{z}_{x,1}(\tilde{\theta},\tilde{\Phi})$ is derived from (10) with $U(\omega) \to \tilde{U}(\omega)$ and $V(\omega) \to \tilde{V}(\omega)$. Since $S(\omega)$ is a diagonal matrix with elements $S(\omega)$ (see (2)), the optimal values of $\tilde{\theta}$ and $\tilde{\Phi}$ are independent of the pulse s(t).

The channel transfer matrix $H(\omega)$ should be estimated at the receiver in order to evaluate the timing tone amplitude $|\tilde{z}_{x,1}(\tilde{\theta},\tilde{\Phi})|^2$. This task can be carried out by using the response of the equalizer (414, described below) used for PMD compensation. Let $$F(\omega) = \begin{bmatrix} F_{11}(\omega) & F_{12}(\omega) \\ F_{21}(\omega) & F_{22}(\omega) \end{bmatrix} \quad (28)$$

be the frequency response matrix of a PMD equalizer in the receiver. The zero-forcing equalizer response is given by $$F(\omega)=H^{-1}(\omega)=S^{-1}(\omega)J^H(\omega). \quad (29)$$

A matrix $G(\omega)$ is defined as:

$$G(\omega) = F^H(\omega) = \begin{bmatrix} G_{11}(\omega) & G_{12}(\omega) \\ G_{21}(\omega) & G_{22}(\omega) \end{bmatrix} \quad (30)$$

where H denotes complex conjugate and transpose. From (29) it is observed that $$G(\omega)=J(\omega)P(\omega), \quad (31)$$

where $P(\omega)=[S^{-1}(\omega)]^*$. Then, a linear transformation is defined:

$$\tilde{G}(\omega) = M(\tilde{\theta}, \tilde{\phi})G(\omega) = \begin{bmatrix} \tilde{G}_{11}(\omega) & \tilde{G}_{12}(\omega) \\ \tilde{G}_{21}(\omega) & \tilde{G}_{22}(\omega) \end{bmatrix}. \quad (32)$$

From (26) and (31), the following can be derived:

$$\tilde{G}(\omega) = M(\tilde{\theta}, \tilde{\phi})J(\omega)P(\omega), \quad (34)$$

$$= \begin{bmatrix} \tilde{U}(\omega) & \tilde{V}(\omega) \\ -\tilde{V}*(\omega) & \tilde{U}*(\omega) \end{bmatrix} P(\omega).$$

Taking into account that only $\tilde{U}(\omega)$ and $\tilde{V}(\omega)$ depend on $\tilde{\theta}$ and $\tilde{\Phi}$ from (26) and (32), it can be shown that criteria (27) is equivalent to $$(\hat{\theta}_{op}, \hat{\phi}_{op}) = \max_{(\tilde{\theta},\tilde{\phi})} |\tilde{\tilde{z}}_{x,1}(\tilde{\theta}, \tilde{\phi})|^2, \quad (35)$$

where $\tilde{\tilde{z}}_{x,1}(\tilde{\theta},\tilde{\Phi})$ is the timing tone amplitude obtained from (10) with $U(\omega) \to \tilde{U}(\omega)$, $V(\omega) \to \tilde{V}(\omega)$ and $S(\omega) \to P(\omega)=1/S^*(\omega)$.

Note that $\tilde{\tilde{z}}_{x,1}(\tilde{\theta},\tilde{\Phi})$ can be derived from the equalizer response through matrix (32) as follows:

$$\tilde{\tilde{z}}_{x,1}(\tilde{\theta}, \tilde{\phi}) = \int_{-\infty}^{\infty} \left[ \tilde{G}_{11}(\omega)\tilde{G}_{11}^*\left(\omega - \frac{2\pi}{T}\right) + \tilde{G}_{12}(\omega)\tilde{G}_{12}^*\left(\omega - \frac{2\pi}{T}\right) \right] d\omega. \quad (36)$$

(36) can be rewritten as $$\tilde{\tilde{z}}_{x,1}(\tilde{\theta},\tilde{\Phi})=\alpha+\beta+\cos(2\tilde{\theta})(\alpha-\beta)+\sin(2\tilde{\theta})(\xi\ e^{j\tilde{\Phi}}+\delta e^{-j\tilde{\Phi}}), \quad (37)$$

where $\alpha$, $\beta$, $\xi$, and $\delta$ are complex parameters independent of the phases $(\tilde{\theta},\tilde{\Phi})$ and given as follows:

$\alpha=\epsilon_{11/11}+\epsilon_{12/12}$ $\beta=\epsilon_{21/21}+\epsilon_{22/22}$ $\xi=\epsilon_{11/21}+\epsilon_{12/22}$ $\epsilon=\epsilon_{21/11}+\epsilon_{22/12}$ where $$\epsilon_{ab/cd} = \frac{1}{2} \int_{-\infty}^{\infty} \left[ G_{ab}(\omega)G_{cd}^*\left(\omega - \frac{2\pi}{T}\right) \right] d\omega, a, b, c, d \in \{1, 2\}.$$

The parameters $\alpha$, $\beta$, $\xi$, and $\delta$ are derived directly from the matrix response of the equalizer $G(\omega)=F^H(\omega)$. Furthermore, it can be seen from the (37) that $\hat{\tilde{z}}_{x,1}(\tilde{\theta},\tilde{\Phi})=\hat{\tilde{z}}_{x,1}(\tilde{\theta}+m\pi,\tilde{\Phi})$ with m integer. Therefore the optimal solution $\hat{\theta}_{op}$ is not unique for $\hat{\theta}_{op} \in \{-\pi,\pi\}$. Furthermore, if $\hat{\theta}_{op}=0$, the timing tone coefficient is independent of the phase $\tilde{\Phi}$.

The maximization in (35) can be carried out iteratively by using a gradient algorithm as follows:

$$(\tilde{\theta}_{i+1}\tilde{\Phi}_{i+1})=(\tilde{\theta}_i\tilde{\Phi}_i)+\mu \nabla_{(\tilde{\theta}_i\tilde{\Phi}_i)}|\hat{\tilde{z}}_{x,1}|^2, i=0,1,\ldots,N_{iter}-1, \quad (38)$$

Where $\mu$ is the step size, $N_{iter}$ is the total number of iterations, and $$\nabla_{(\tilde{\theta},\tilde{\phi})}|\hat{\tilde{z}}_{x,1}|^2 = \left(\frac{\partial |\hat{\tilde{z}}_{x,1}(\tilde{\theta},\tilde{\phi})|^2}{\partial \tilde{\theta}}, \frac{\partial |\hat{\tilde{z}}_{x,1}(\tilde{\theta},\tilde{\phi})|^2}{\partial \tilde{\phi}}\right) \quad (39)$$

Taking into account that, e.g., $$\frac{\partial |z(\theta,\phi)|^2}{\partial \theta} = 2\Re\left\{z(\theta,\phi)\left[\frac{\partial z(\theta,\phi)}{\partial \theta}\right]^*\right\}$$

from (37) it is possible to show $$\frac{\partial |\hat{\tilde{z}}_{x,1}(\tilde{\theta},\tilde{\phi})|^2}{\partial \tilde{\theta}} = \quad (40)$$

$$4\Re\left\{\hat{\tilde{z}}_{x,1}(\tilde{\theta},\tilde{\phi})[-\sin(2\tilde{\theta})(\alpha-\beta)+\cos(2\tilde{\theta})(\xi e^{j\tilde{\phi}}+\delta e^{-j\tilde{\phi}})]^*\right\}$$

$$\frac{\partial |\hat{\tilde{z}}_{x,1}(\tilde{\theta},\tilde{\phi})|^2}{\partial \tilde{\phi}} = 2\Im\left\{\hat{\tilde{z}}_{x,1}(\tilde{\theta},\tilde{\phi})[\sin(2\tilde{\theta})(\xi e^{j\tilde{\phi}}+\delta e^{-j\tilde{\phi}})]^*\right\}, \quad (41)$$

where $\Im\{\bullet\}$ denotes imaginary part.

Implementation in Digital Receivers with FSE

Evaluation of the Timing Tone Amplitude

An example implementation is now described in which a multiple-input multiple-output (MIMO) T/2 fractional-spaced equalizer (FSE) is used for PMD compensation. Similar principles may be applied to embodiments using other types of equalizers.

Let $\tilde{g}_{ab}(t)$ be the continuous time pulse given by $\tilde{g}_{ab}(t)=F^{-1}\{\tilde{G}_{ab}(j\omega)\}$, with $a,b \in \{1,2\}$. Let $$\tilde{G}_{ab}\left(e^{j\omega\frac{T}{2}}\right)$$

denote the Fourier transform of the discrete-time pulse $\tilde{g}_{ab}[k]=\tilde{g}_{ab}(kT/2)$. Assuming that the bandwidth excess of the received signal is lower than 100% (i.e., $|G_{ab}(j\omega)|=0$ for $|\omega|>2\pi/T$), it can be verified that $$\tilde{G}_{ab}\left(e^{j\omega\frac{T}{2}}\right) = \frac{2}{T}\tilde{G}_{ab}(j\omega) \text{ for } -\frac{2\pi}{T} \le \omega < \frac{2\pi}{T}. \quad (42)$$

From (36) and (42) the timing tone amplitude $\hat{\tilde{z}}_{x,1}(\tilde{\theta},\tilde{\Phi})$ results in $$\hat{\tilde{z}}_{x,1}(\tilde{\theta},\tilde{\phi}) = \quad (43)$$

$$K_0 \int_0^{2\pi} \left[\tilde{G}_{11}(e^{j\Omega})\tilde{G}_{11}^*(e^{j(\Omega-\pi)}) + \tilde{G}_{12}(e^{j\Omega})\tilde{G}_{12}^*(e^{j(\Omega-\pi)})\right]d\Omega,$$

where $\Omega=\omega T/2$ and $K_0$ is a predetermined constant (i.e., it does not depend on $(\tilde{\theta},\tilde{\Phi})$). In order to simplify the evaluation of $\hat{\tilde{z}}_{x,1}(\tilde{\theta},\tilde{\Phi})$, it is assumed that the terms $\tilde{G}_{ab}(\omega)\tilde{G}^*_{ab}$ $$\left(\omega - \frac{2\pi}{T}\right)$$

in (36) are concentrated around $\omega=\pi/T$. Thus, $$\hat{\tilde{z}}_{x,1}(\tilde{\theta},\tilde{\phi}) \approx \quad (44)$$

$$K_0 \int_{\frac{\pi}{2}-\Delta\Omega}^{\frac{\pi}{2}+\Delta\Omega} \left[\tilde{G}_{11}(e^{j\Omega})\tilde{G}_{11}^*(e^{j(\Omega-\pi)}) + \tilde{G}_{12}(e^{j\Omega})\tilde{G}_{12}^*(e^{j(\Omega-\pi)})\right]d\Omega,$$

Furthermore, the integral can be approximated by a sum of discrete values of the Fourier transforms around $\Omega=\pi/2$, i.e., $$\hat{\tilde{z}}_{x,1}(\tilde{\theta},\tilde{\phi}) \approx \quad (45)$$

$$K_1 \sum_n \left[\tilde{G}_{11}(e^{j\Omega_n})\tilde{G}_{11}^*(e^{j(\Omega_n-\pi)}) + \tilde{G}_{12}(e^{j\Omega_n})\tilde{G}_{12}^*(e^{j(\Omega_n-\pi)})\right],$$

where $K_1$ is a certain factor independent of $(\tilde{\theta},\tilde{\Phi})$, $$\tilde{G}_{ab}(e^{j\Omega_n}) = \sum_{k=0}^{N-1} \tilde{g}_{ab}[k]e^{-jk\Omega_n} \quad (46)$$

with N being the number of taps of $\tilde{g}_{ab}[k]$.

Based on (45), it is possible to show that $$\hat{\tilde{z}}_{x,1}(\tilde{\theta},\tilde{\Phi}) \approx K_2 \hat{\tilde{z}}'_{x,1}(\tilde{\theta},\tilde{\Phi}), \quad (47)$$

where $K_2$ is a constant factor, $$\hat{\tilde{z}}'_{x,1}(\tilde{\theta},\tilde{\Phi}) = \hat{\alpha}+\hat{\beta}+\cos(2\tilde{\theta})(\hat{\alpha}-\hat{\beta})+\sin(2\tilde{\theta})(\hat{\xi}e^{j\tilde{\Phi}}+\hat{\delta}e^{-j\tilde{\Phi}}), \quad (48)$$

while $$\hat{\alpha}=\hat{\epsilon}_{11/11}+\hat{\epsilon}_{12/12}, \hat{\beta}=\hat{\epsilon}_{21/21}+\hat{\epsilon}_{22/22},$$

$$\hat{\xi}=\hat{\epsilon}_{11/21}+\hat{\epsilon}_{12/22}, \hat{\delta}=\hat{\epsilon}_{21/11}+\hat{\epsilon}_{22/12}, \quad (49)$$

with $$\hat{\epsilon}_{ab/cd} = \sum_n G_{ab}(e^{j\Omega_n})G_{cd}^*(e^{j(\Omega_n-\pi)}), a,b,c,d \in \{1,2\} \quad (50)$$

Let $$f_{ab}[k] = \mathcal{F}^{-1}\left\{F_{ab}\left(e^{j\omega\frac{T}{2}}\right)\right\}$$

be the discrete-time impulse response of the MIMO FSE. Then, from (30), $\hat{\epsilon}_{ab/cd}$ can be derived directly from the impulse response of the FSE:

$$G_{ab}(e^{j\Omega_n}) = \sum_{k=0}^{N-1} g_{ab}[k]e^{-jk\Omega_n}, \ a, b \in \{1, 2\} \quad (51)$$

with $$g_{11}[k]=f^*_{11}[N-k-1], g_{12}[k]=f^*_{21}[N-k-1],$$

$$g_{21}[k]=f^*_{12}[N-k-1], g_{22}[k]=f^*_{22}[N-k-1],$$

$$k=0,1,\ldots,N-1. \quad (52)$$

As will be shown below, the set $$\Omega_n \in \left\{\frac{\pi}{4}, \frac{\pi}{2}, \frac{3\pi}{4}\right\}$$

provides very good accuracy to maximize the timing tone energy.

Gradient Algorithm Based Maximization

Since factor $K_2$ in (47) is independent of $(\tilde{\theta},\tilde{\Phi})$, criteria (35) reduces to $$(\tilde{\theta}_{op}, \tilde{\theta}_{op}) \approx \max_{(\tilde{\theta},\tilde{\phi})} |\tilde{z}'_{x,1}(\tilde{\theta}, \tilde{\phi})|^2, \quad (53)$$

where $\tilde{z}'_{x,1}(\tilde{\theta},\tilde{\Phi})$ is given by (48). As described previously, maximization in (53) can be carried out iteratively by using the gradient algorithm as follows:

$$(\tilde{\theta}_{i+1},\tilde{\Phi}_{i+1})=(\tilde{\theta}_i,\tilde{\Phi}_i)+\mu \nabla_{(\tilde{\theta}_i,\tilde{\Phi}_i)}|\tilde{z}'_{x,1}|^2, \ i=0,1,\ldots, \\ N_{iter}-1, \quad (54)$$

where $$\nabla_{(\tilde{\theta},\tilde{\phi})}|\tilde{z}'_{x,1}|^2 = \left(\frac{\partial |\tilde{z}'_{x,1}(\tilde{\theta}, \tilde{\phi})|^2}{\partial \tilde{\theta}}, \frac{\partial |\tilde{z}'_{x,1}(\tilde{\theta}, \tilde{\phi})|^2}{\partial \tilde{\phi}}\right) \quad (55)$$

with $$\frac{\partial |\tilde{z}'_{x,1}(\tilde{\theta}, \tilde{\phi})|^2}{\partial \tilde{\theta}} = \\ 4\Re\left\{\tilde{z}'_{x,1}(\tilde{\theta}, \tilde{\phi})\left[-\sin(2\tilde{\theta})(\hat{\alpha} - \hat{\beta}) + \cos(2\tilde{\theta})(\hat{\xi}e^{j\tilde{\phi}} + \hat{\delta}e^{-j\tilde{\phi}})\right]^*\right\} \quad (56)$$

$$\frac{\partial |\tilde{z}'_{x,1}(\tilde{\theta}, \tilde{\phi})|^2}{\partial \tilde{\phi}} = 2\Im\left\{\tilde{z}'_{x,1}(\tilde{\theta}, \tilde{\phi})\left[\sin(2\tilde{\theta})(\hat{\xi}e^{j\tilde{\phi}} - \hat{\delta}e^{-j\tilde{\phi}})\right]^*\right\}, \quad (57)$$

The technique described above will achieve best performance when there is an initial convergence of the FSE. Towards this end, a proper start-up strategy of the receiver is desired.

Receiver Architecture with PMD Compensation

Figure 4A:
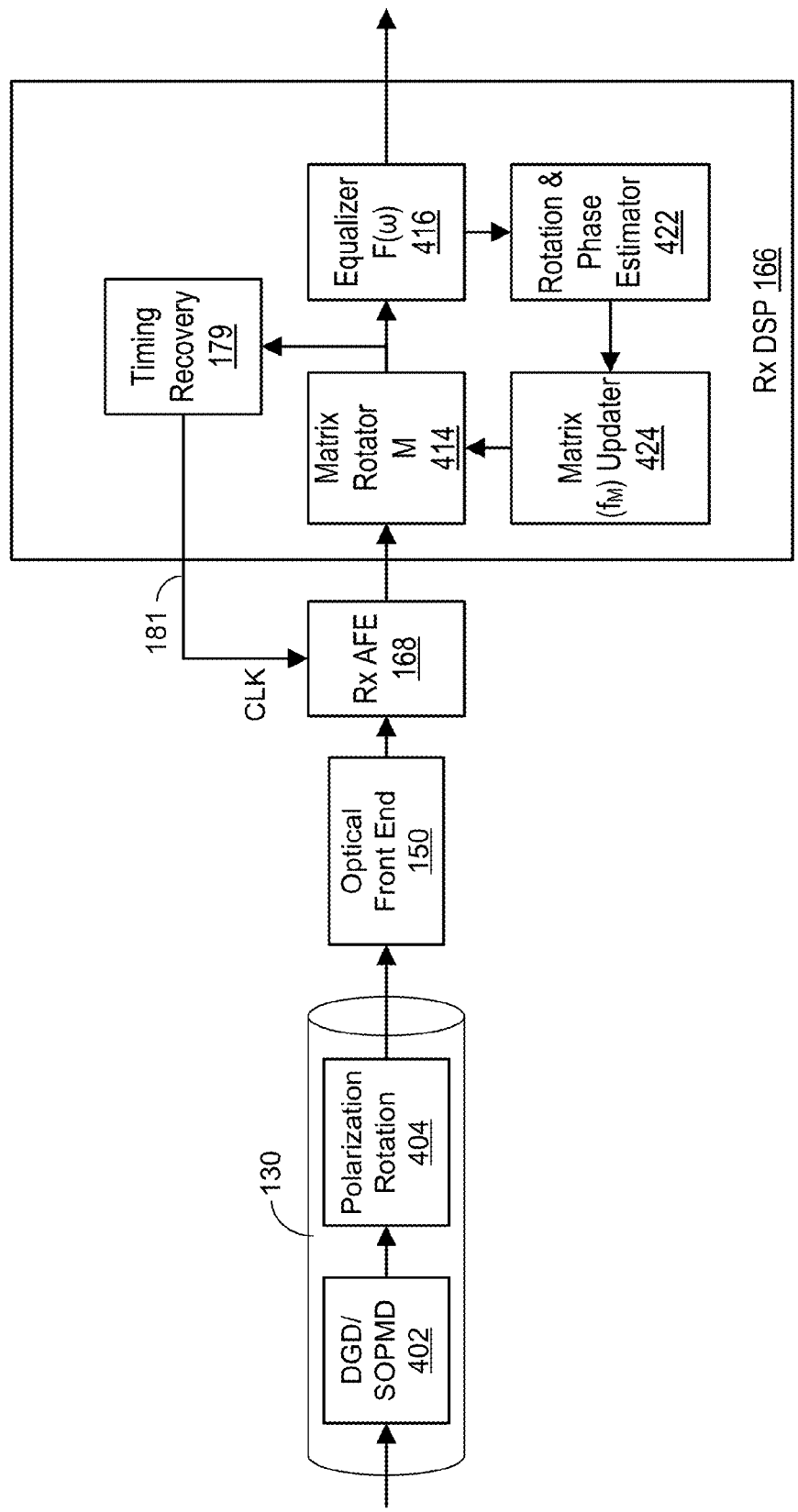
FIG. 4A is a block diagram of a first embodiment of a receiver DSP architecture.

FIG. 4A illustrates an architecture for an Rx DSP 166 of a receiver 160 that compensates for PMD effects to reduce or eliminate the timing recovery problem associated with half-baud DGD according to the principles described above. A channel model for channel 130 is also illustrated in which PMD effects are modeled as DGD/second-order PMD (SOPMD) block 402 and polarization rotation block 404.

In an ideal optical fiber transmitting a dual-polarized optical signal, the two polarization components of the optical signal will travel through fiber at the same speed. However, in a real fiber, imperfections can result in the two polarization components traveling at different speeds, which can be modeled as a random time delay between the two polarizations and a different spreading of the two polarizations. A measure of the time delay between the two polarizations is referred to as DGD, which depends on both the length and the quality of the fiber. Channel impairments may result in both first order and second order PMD effects; DGD (or first-order PMD) is a frequency-independent delay between the two polarizations, and second-order PMD is a frequency dependent delay between the two polarizations, resulting in different pulse spreading on the two polarizations. Moreover, the DGD is not necessarily constant over time. Thus, DGD/SOPMD block 402 represents the PMD introduced by the channel and how the PMD changes over time. As shown above, the PMD becomes particularly problematic for timing recovery when the DGD is half the symbol period. It can also be problematic when the DGD exceeds half the symbol period when there is also second order PMD present.

The polarization rotation block 404 models polarization rotation of the optical signal as it propagates through the channel 130 with a rotation frequency $f_{rx}$, where the rotation frequency here means how fast the state of polarization is changing on the Poincare sphere, measured in Hz. As the state of polarization changes at the output of the channel 130, a new matrix M for the matrix rotator 414 is used to track the state of polarization to mitigate problems with timing recovery. Thus, as $f_{rx}$ increases, the update rate of the matrix rotator will increase.

As described above, optical front end 150 receives the optical signal and produces an electrical signal representing the polarization components as, for example, a two-dimensional complex vector (or alternatively as four dimensional vector of real components). The Rx AFE 168 samples the analog signal vector produced by the optical front end 150 based on a clock signal 181 to convert the analog electrical signal vector to the digital domain for processing by the Rx DSP 166. The Rx DSP 166 processes the digitized signal (e.g., a vector) to compensate for the channel impairments described above and recover the transmitted data. Furthermore, the Rx DSP 166 processes the digitized signal to generate the clock signal 181 for sampling the received analog signal.

In the illustrated embodiment, operation of the Rx DSP 166 is illustrated in terms of functional blocks representing various functions carried out by the Rx DSP 166. In practice, the illustrated functional blocks may be implemented as instructions stored to a non-transitory computer-readable storage medium that are loaded and executed by the Rx DSP 166. In alternative embodiments, all or portions of the functions described herein may be implemented in hardware, software, firmware, or a combination of hardware, software, and/or firmware.

In one embodiment, the Rx DSP 166 comprises a matrix rotator 414, an equalizer 416 (e.g., a fractionally spaced equalizer (FSE)), a rotation and phase estimator 422, a matrix updater 424, and the timing recovery block 179. The matrix rotator 414 is configured to approximate a transfer function that reduces or eliminates the effect of PMD on the timing tone energy. In general, the matrix rotator 414 orients the received signal vector to minimize problems in the timing recovery loop indicated by the clock feedback from the timing recovery 179. For example, in one embodiment, matrix rotator 414 applies a rotation matrix M to the digital signal from the Rx AFE 168 based on a matrix received from matrix updater 424 in a feedback loop. Operation of the matrix rotator 414 is described in further detail below.

Based on the compensated signal from the matrix rotator 414, timing recovery block 179 performs a timing recovery algorithm to generate clock signal 181 used to sample the analog signal in the Rx AFE 168. For example, in one embodiment, timing recovery is achieved using the nonlinear spectral line method and may be based on either one or two polarizations, as discussed above.

Equalizer 416 (which in one embodiment is a fractionally-spaced equalizer (FSE)) equalizes the compensated signal from the matrix rotator 414 to compensate for various channel impairments such as intersymbol interference effects. For example, in one embodiment, equalizer 416 applies a transfer function to received digital samples to generate equalized samples. Each equalized sample comprises a weighted average of a given digital sample and one or more other samples. The weights may be dynamically updated to adjust to perceived channel impairments. The primary purpose of the equalizer 416 is to remove pulse spreading and intersymbol interference caused by time-varying impairments in the channel 130.

Rotation and phase estimator 422 estimates rotation and phase parameters $\theta$, $\Phi$, of the rotation matrix M applied by the matrix rotator 414. This estimation may be based on the transfer function applied by equalizer 416 as will be described below. Thus, the rotation and phase parameters may be dynamically updated over time.

Matrix updater 424 updates the rotation matrix M applied by matrix rotator 414 based on the rotation and phase parameters, $\theta$, $\Phi$, generated by rotation and phase estimator 422. For example, in one embodiment, matrix updater 424 applies the update periodically with frequency $f_m$.

Note that the embodiment of FIG. 4A assumes that there is no chromatic dispersion (CD) in the signal received by Rx DSP 166. For example, CD may be compensated prior to the Rx DSP 166 (e.g., in the channel 130 or optical front end 150), or the channel 130 may be one that does not produce any significant CD.

Figure 4B:
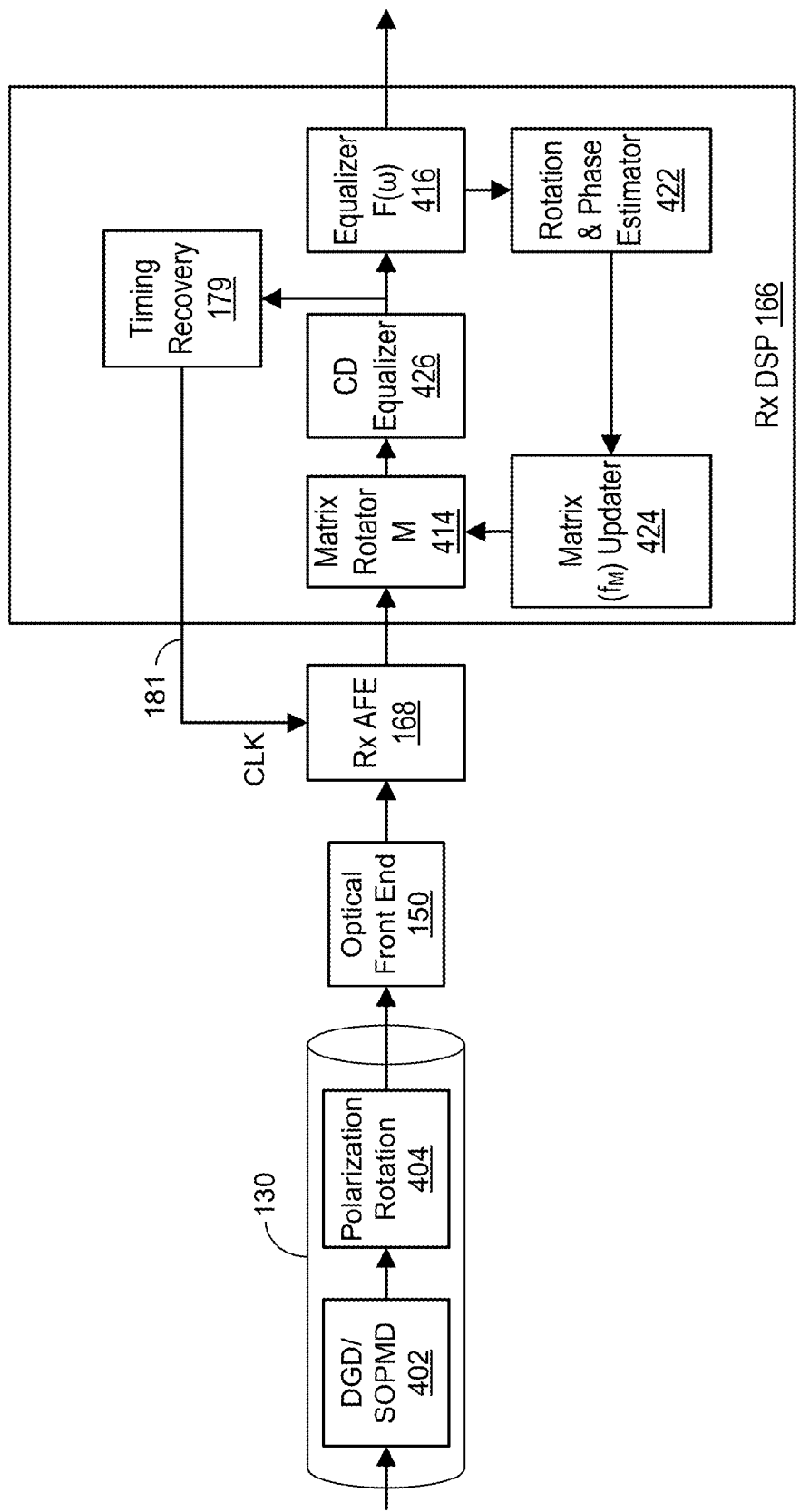
FIG. 4B is a block diagram of a second embodiment of a receiver DSP architecture.

FIG. 4B illustrates an alternative architecture of an Rx DSP 166 that is similar to the architecture in FIG. 4A but includes a CD equalizer 426 in the signal path after the matrix rotator 414 and before timing recovery block 179 and equalizer 416. Thus, in this embodiment, the Rx DSP 166 compensates for CD introduced by channel 130.

Figure 4C:
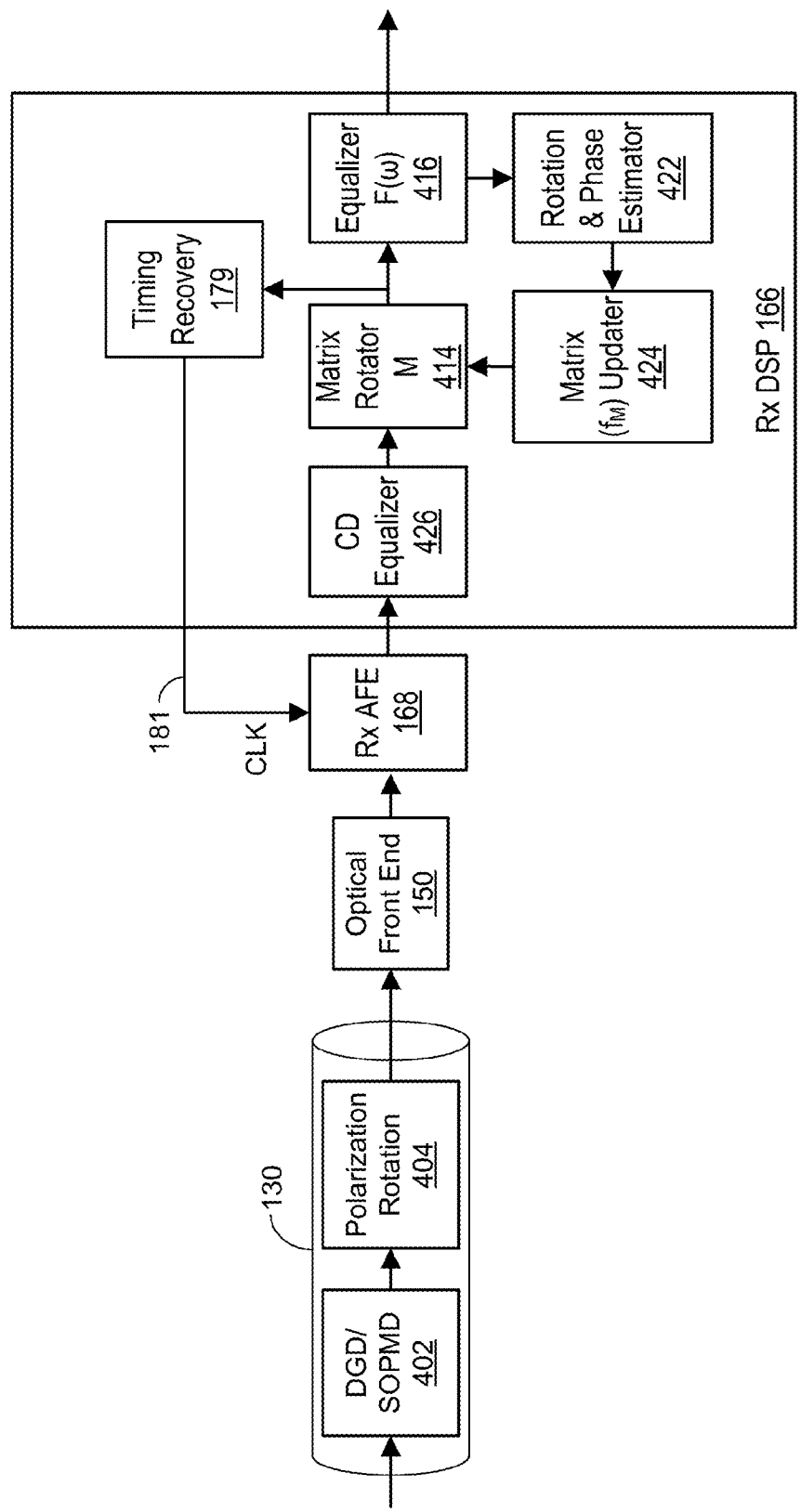
FIG. 4C is a block diagram of a third embodiment of a receiver DSP architecture.

FIG. 4C illustrates an alternative architecture of an Rx DSP 166 that is similar to the architecture in FIG. 4B except that the CD equalizer 426 is instead positioned between the Rx AFE 168 and matrix rotator 414 in the signal. An advantage of this embodiment relative to the embodiment of FIG. 4B is that the latency between matrix rotator 414 and equalizer 416 is significantly reduced (because CD equalizer 426 is computationally intensive). As a result of this reduced latency, the channel characteristics estimated by equalizer 416 used to update matrix rotator 414 (via rotation & phase estimator 422 and matrix updater 424) are based on data closer in time to the data currently being processed by matrix rotator 414. Thus, performance of Rx DSP 166 may improve. Note, however, that some receiver architectures already include a matrix rotator in the signal path prior to CD equalizer 426 (not shown in FIG. 4C). Thus, in one embodiment having the architecture of FIG. 4C, the matrix rotator 414 is in addition to an input matrix rotator (not shown), while the architecture of FIG. 4B may have the advantage of using only a single matrix rotator block that serves both purposes.

Figure 4D:
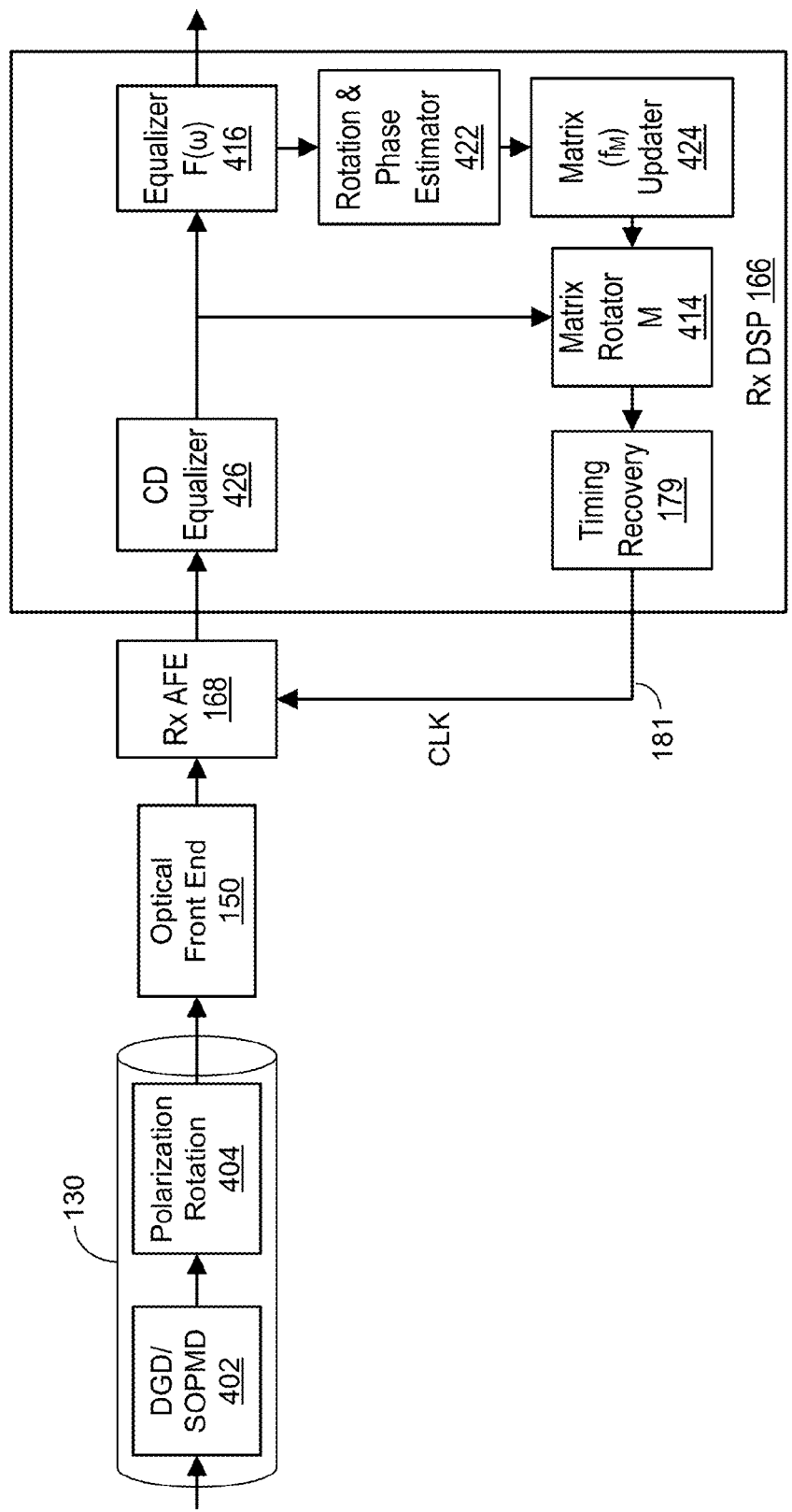
FIG. 4D is a block diagram of a fourth embodiment of a receiver DSP architecture.

FIG. 4D illustrates another alternative architecture of an Rx DSP 166 similar to the architecture of FIG. 4C except that matrix rotator 414 is now moved outside of the main signal path. Thus, in this embodiment, the matrix rotation applied by matrix rotator 414 is applied only in the timing recovery path and does not directly affect the signal processed by equalizer 416.

As will be apparent, other variations of the disclosed architecture are also possible.

Figure 5:
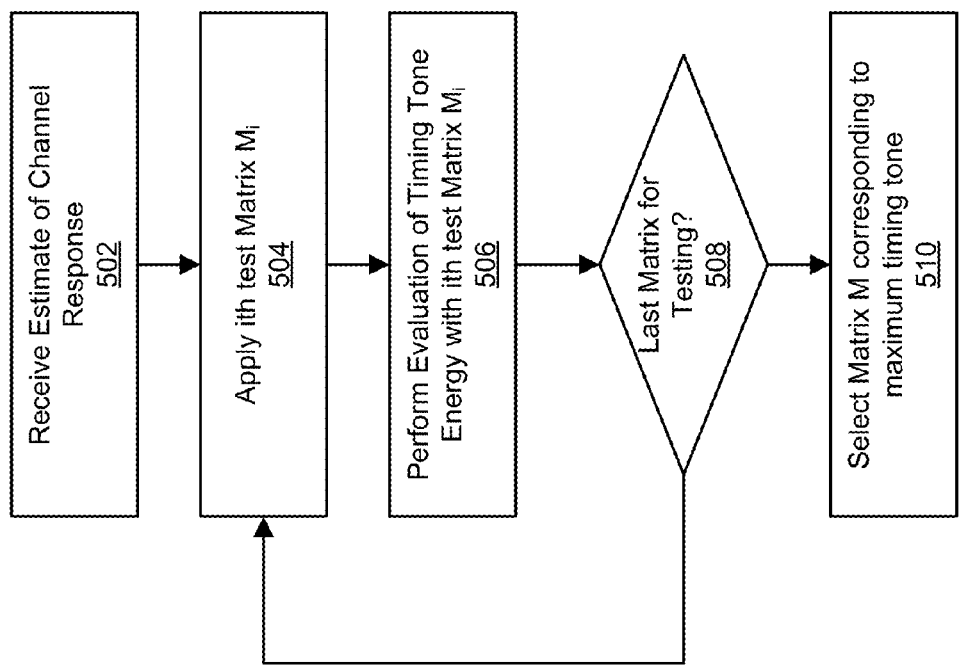
FIG. 5 is a flowchart illustrating an embodiment of a general process for determining a rotation matrix to compensate for PMD effects on timing recovery in a receiver.

FIG. 5 illustrates an embodiment of a general process performed by the rotation and phase estimator 422 to determine the optimal parameters of $\theta$, $\Phi$ rotation matrix M. Rotation and phase estimator 422 receives 502 an estimate of the channel response $H(\omega)$. For example, in one embodiment, a reasonable estimate for the channel response $H(\omega)$ may be derived from the equalizer response $F(\omega)$ since the equalizer 416 attempts to model and compensate for the channel characteristics. In an ith iteration, rotation and phase estimator 422 applies 504 an ith test matrix $M_i$ for testing. For example, in one embodiment, parameters $\theta$, $\Phi$ of rotation matrix M are swept over a predetermined range (using some predetermined increments) to generate the set of i test matrices M. Alternatively, a gradient based iterative algorithm is used as described above that determines the set of i test matrices in a more efficient manner and enables rotation and phase estimator 422 to converge on the optimal parameters $\theta$, $\Phi$ more quickly. The timing tone energy using the ith test matrix $M_i$ is then evaluated 506 by estimating the timing tone energy that will be produced based on this matrix. At decision block 508, if the ith test matrix $M_i$ is not the last one for testing, i is incremented and the process moves back to step 504. If at decision block 508, the ith test matrix $M_i$ is the last one for testing, the matrix M corresponding to the maximum timing tone is selected 510 for use by matrix rotator M.

Figure 6B:
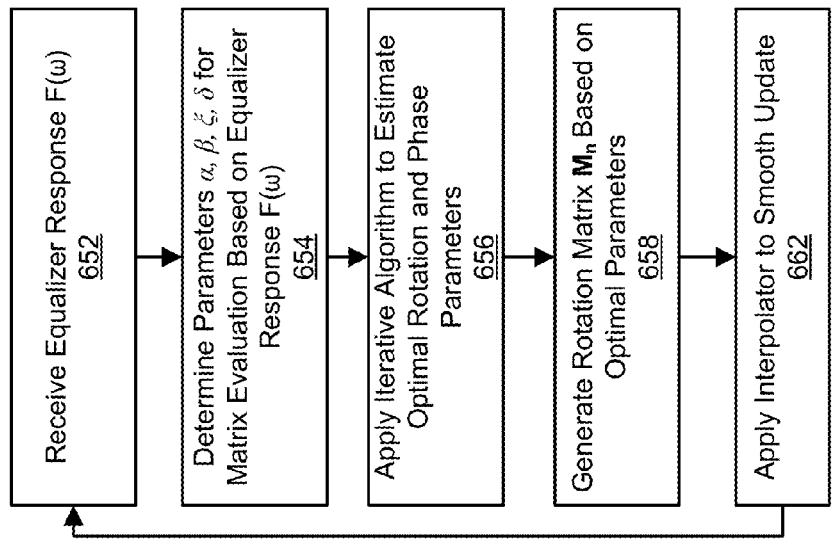
FIG. 6B is a flowchart illustrating a second embodiment of a process for estimating an optimal rotation matrix in a receiver.
Figure 6A:
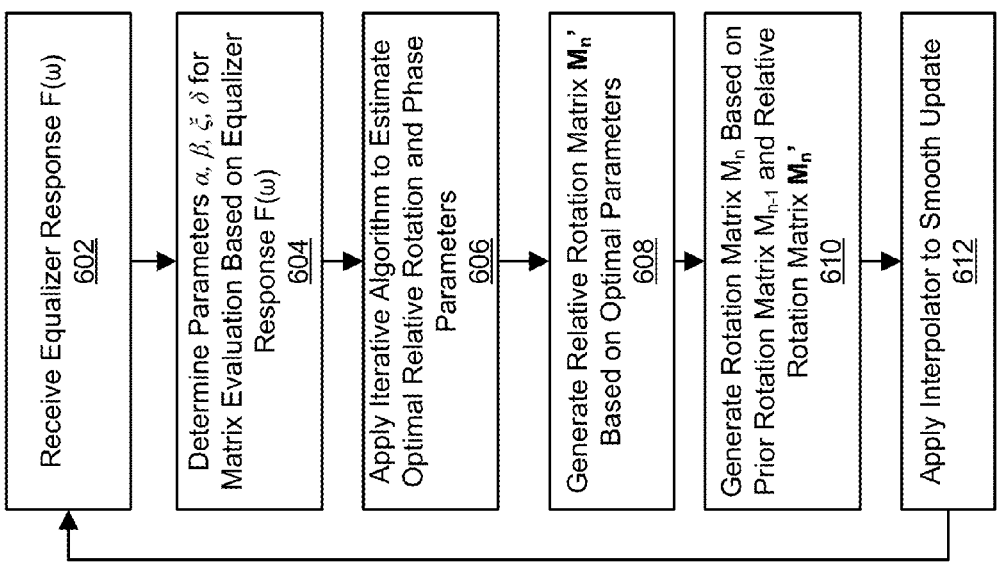
FIG. 6A is a flowchart illustrating a first embodiment of a process for estimating an optimal rotation matrix in a receiver.

FIG. 6A-6B illustrate alternative examples of processes performed by rotation and phase estimator 422 and matrix updater 424 to update matrix M. These processes may be more efficient than the general process of FIG. 5 illustrated above, and may be more specifically suited for one or more particular DSP architectures as will be explained below.

Beginning with FIG. 6A, a process is illustrated that may be performed by the receivers of FIGS. 4A-4C described above. In the following descriptions, the index n refers to the nth iteration of updates applied to the rotation matrix M by matrix updater 424. Rotation and phase estimator 422 receives 602 a representation of equalizer response $F(\omega)$ applied by equalizer 416. As will be observed from FIGS. 4A-4C, in each of these architectures, matrix rotator 414 is applied prior to and in the same signal path as equalizer 416. Thus, the channel estimate generated by equalizer 416 is based on the rotated signal generated by matrix rotator 414 and thus this rotation will be represented in the equalizer response $F(\omega)$. Based on the equalizer response $F(\omega)$, rotation and phase estimator 422 determines 604 parameters $\alpha$, $\beta$, $\xi$, and $\delta$ used in the iterative optimization algorithm described above. Rotation and phase estimator 422 then applies 606 the iterative algorithm described above for estimating optimal rotation and phase parameters $\theta_n^{out}$, $\Phi_n^{out}$. Note that since the equalizer response $F(\omega)$ is based on the rotated output of matrix rotator 414, the optimal rotation and phase parameters $\theta_n^{out}$, $\Phi_n^{out}$ will be relative to the rotation and phase parameters from the previous iteration. In one embodiment, the iterative algorithm uses $\theta_n^{in}=0$ and $\Phi_n^{in}=0$ as initial conditions for the iterative algorithm because the change in optimal rotation from the previous iteration is presumed to be small. A relative rotation matrix $M'_n$ for the current iteration n is then generated 608 based on the optimal relative parameters described above, where $M'_n$ is relative to previous rotation matrix $M_{n-1}$. Matrix updater 424 then generates 610 matrix $M_n$ for the current iteration based on the matrix $M_{n-1}$ from the previous iteration and the relative rotation matrix $M'_n$ as follows $$M_n = M'_n M_{n-1}.$$

Matrix updater 424 may optionally apply 612 an interpolator to smooth the update. For example, instead of transitioning directly from matrix $M_{n-1}$ to matrix $M_n$ matrix updater 424 may apply incremental updates over time (e.g., in k steps) to ensure a smoother transition. In some embodiments, matrix updater 424 may instead transition directly from matrix $M_{n-1}$ to matrix $M_n$ (e.g., k=1). The process of FIG. 6A then repeats for the next iteration n.

FIG. 6B illustrates a variation of the process described above that may be performed in a receiver having the architecture of FIG. 4D. As in the embodiment of FIG. 6A, rotation and phase estimator 422 receives 652 a representation of equalizer response $F(\omega)$ applied by equalizer 416. However, unlike the architectures of FIGS. 4A-4C, matrix rotator 414 in FIG. 4D is outside the main signal path and therefore equalizer 416 does not see the rotated signal. Rather, in this architecture, the channel estimate generated by equalizer 416 will be a truer estimate of the channel (without the rotation applied by matrix rotator 414) and thus the equalizer response $F(\omega)$ is based on an un-rotated signal. Based on the equalizer response $F(\omega)$, rotation and phase estimator 422 determines 654 parameters $\alpha$, $\beta$, $\xi$, and $\delta$ used in the iterative optimization algorithm described above. Rotation and phase estimator 422 then applies 656 the iterative algorithm described above for estimating optimal rotation and phase parameters $\theta_n^{out}$, $\Phi_n^{out}$. Here, since the equalizer response $F(\omega)$ is based on the input signal that does not include the rotation applied by matrix rotator 414, the optimal rotation and phase parameters $\theta_n^{out}$, $\Phi_n^{out}$ are relative to the signal at the receiver input (rather than being relative to a rotated signal). In one embodiment, the iterative algorithm in this process uses $\theta_n^{in}=\theta_{n-1}^{out}$, $\Phi_n^{in}=\Phi_{n-1}^{out}$ as initial conditions for the iterative algorithm because the optimal rotation is presumed to be relatively close to that applied in the previous iteration. A rotation matrix $M_n$ for the current iteration n is then generated 658 based on the optimal parameters described above.

Matrix updater 424 may optionally apply 662 an interpolator to smooth the update. For example, instead of transitioning directly from matrix $M_{n-1}$ to matrix $M_n$ matrix updater 424 may apply incremental updates over time (e.g., in k steps) to ensure a smoother transition. In some embodiments, the matrix updater 424 may transition directly from matrix $M_{n-1}$ to matrix $M_n$ (e.g., k=1). The process of FIG. 6B then repeats for the next iteration n.

Numerical Results for Example Embodiment
Time Invariant Optical Channels

Figure 7A:
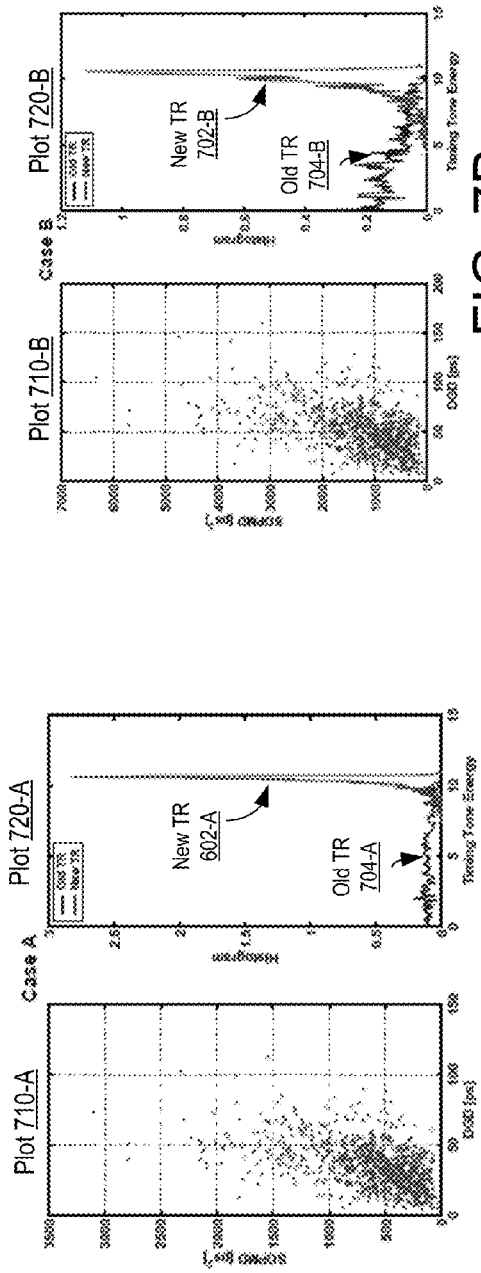
FIG. 7A is a plot of timing tone energy for a set of DGD delay for a first example communication system.
Figure 7B:
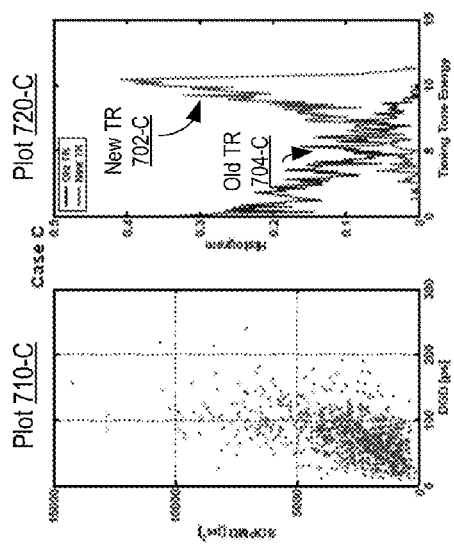
FIG. 7B is a plot of timing tone energy for a set of DGD delay for a second example communication system.
Figure 7C:
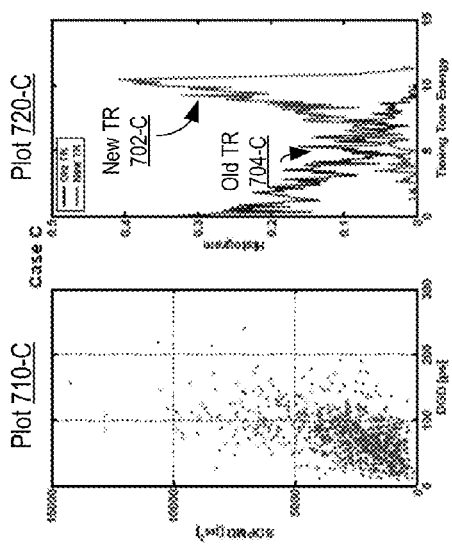
FIG. 7C is a plot of timing tone energy for a set of DGD delay for a third example communication system.

Example simulations of the timing recovery technique described above is now described for example transmissions over optical channels in the presence of PMD and second-order PMD (SOPMD). Example results are illustrated in FIGS. 7-8 for three sets of 1000 random fibers with mean DGD and SOPMD:

Case A: $\overline{DGD}=35$ ps/$\overline{SOPMD}=626$ ps$^2$
Case B: $\overline{DGD}=50$ ps/$\overline{SOPMD}=1277$ ps$^2$
Case C: $\overline{DGD}=75$ ps/$\overline{SOPMD}=2874$ ps$^2$ For example, FIG. 7A-C shows the DGD/SOPMD region and histograms of the timing tone energy for the three cases A, B, C above (FIGS. 7A, 7B, 7C respectively). For example, in FIG. 7A, a first plot 710-A shows DGD and SOPMD values for the 1000 random fibers in case A. FIG. 7B and 7C similarly include plots 710-B, 710-C respectively for the 1000 random fibers in cases B and C respectively. The second plot 720-A in FIG. 7A is a histogram showing occurrences of different timing tone energies observed for the data of plot 710-A for case A. FIGS. 7B and 7C show similar plots 720-B, 720-C respectively with histograms based on cases B and C respectively. The plots 720 illustrates these timing tone energies according to both a conventional timing recovery algorithm (i.e., old TR 704-A, 704-B, 704-C) and using the timing recovery technique described herein (i.e., new TR-702-A, 704-B, 704-C). To simplify the implementation of (54), the examples here use the following modified version of the iterative algorithm:

$$(\tilde{\theta}_{i+1}, \tilde{\Phi}_{i+1}) = (\tilde{\theta}_i, \tilde{\Phi}_i) + \mu \text{sign}(\nabla_{(\tilde{\theta}_i, \tilde{\Phi}_i)} |\tilde{z}'_{x,1}|^2), i=0, 1, \ldots, N_{iter}-1. \quad (58)$$

where sign($\cdot$) is the sign function. The number of iterations and the step size are $N_{iter}=20$ and $\mu=2^{-4}$, respectively. The number of taps of the FSE is N=16 (see (46)) and the optical signal-to-noise ratio (OSNR) is 10 dB.

From FIG. 7A-7C, it can be verified that the probability that the timing tone energy vanishes (i.e., $\Pr\{|\tilde{z}_{x,1}|^2=0\}\rightarrow 0$) is drastically reduced in curves 702-A, 702-B, 702-C using the timing recovery technique described herein relative to the conventional timing recovery technique in curve 704-A, 704-B, 704-C.

Time Variant Optical Channels

Figures 8A, 8B:
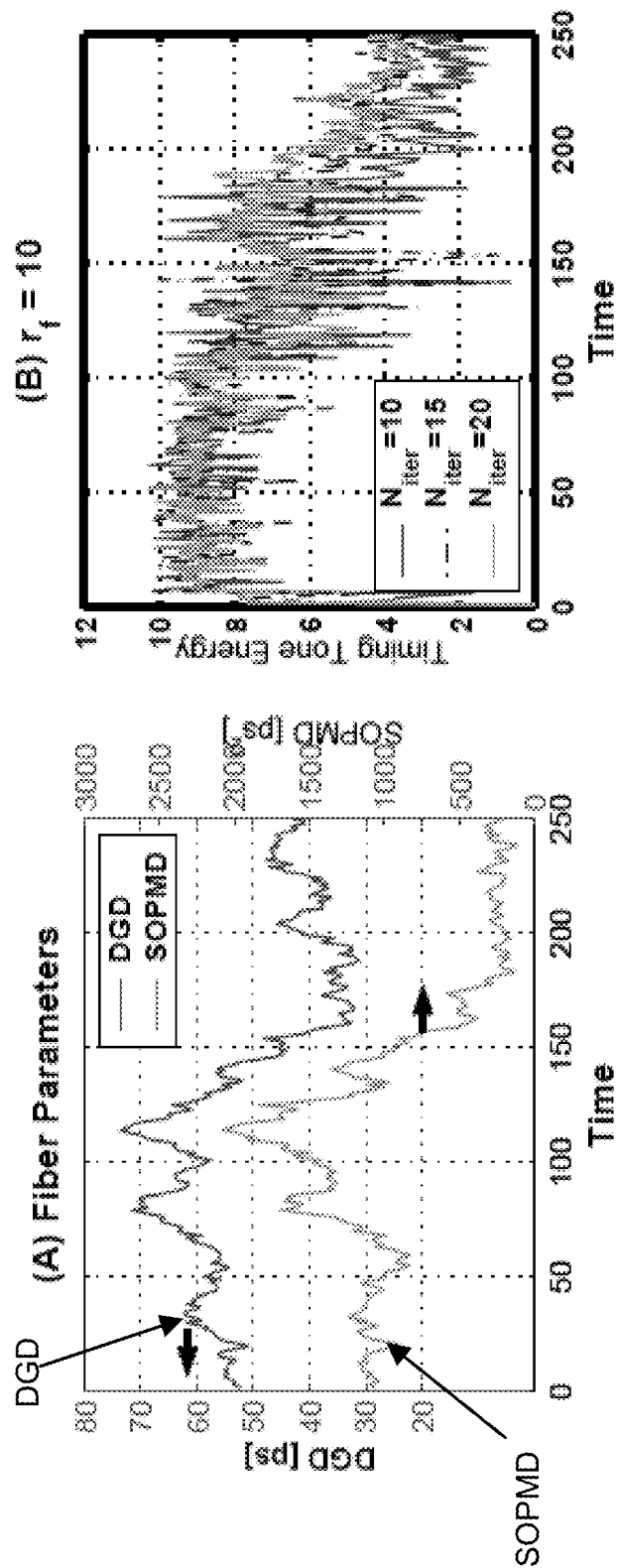
FIG. 8A is a plot of an example time varying channel used to illustrate performance of a receiver architecture that compensates for effects of PMD on timing recovery.
FIG. 8B is a plot illustrating performance of a receiver architecture that compensates for effects of PMD on timing recovery when the update frequency of the rotation matrix is 10 times the polarization rotation frequency.
Figure 8C:
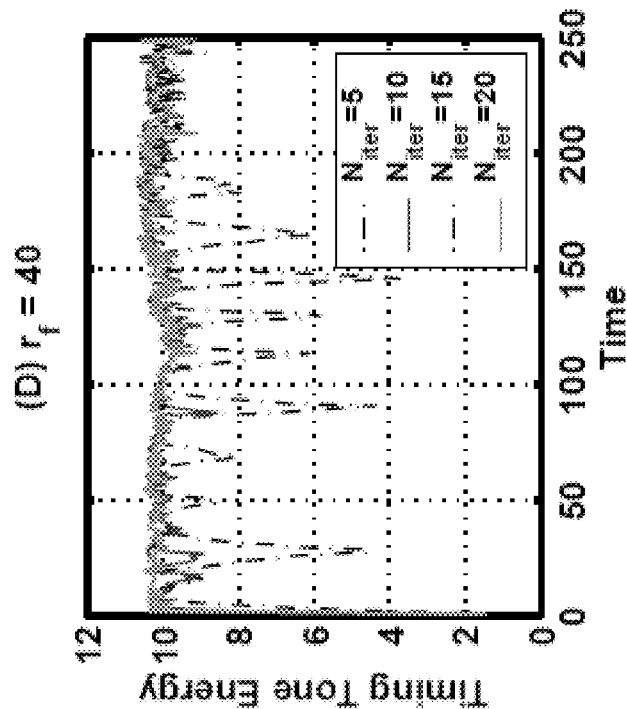
FIG. 8C is a plot illustrating performance of a receiver architecture that compensates for effects of PMD on timing recovery when the update frequency of the rotation matrix is 20 times the polarization rotation frequency.
Figure 8D:
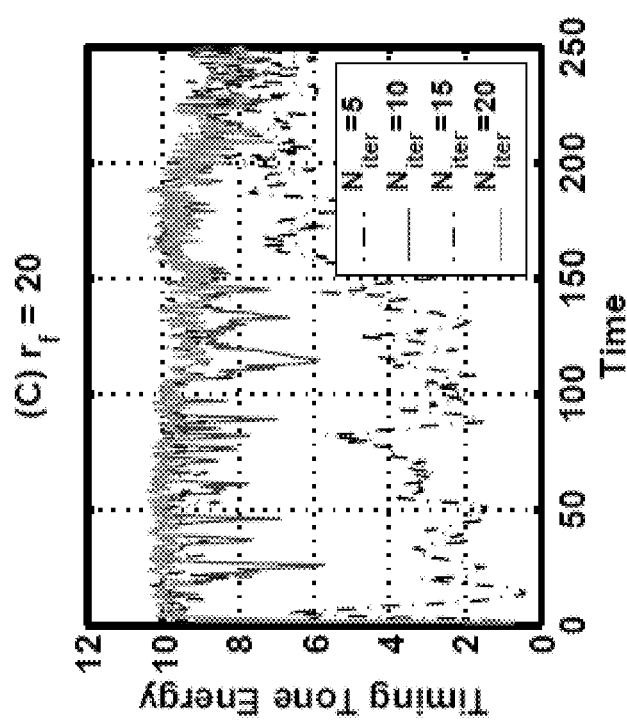
FIG. 8D is a plot illustrating performance of a receiver architecture that compensates for effects of PMD on timing recovery when the update frequency of the rotation matrix is 40 times the polarization rotation frequency.

FIGS. 8A-8D illustrate example performance of the described timing recovery technique in the presence of a time variant optical channel. FIG. 8A illustrates time variations of the fiber parameters (DGD and SOPMD) for an example channel. FIGS. 8B-8D are plots of the timing tone energy over time for the example channel of FIG. 8A based on different values of (1) the number of iterations $N_{iter}$; and (2) the frequency ratio:

$$r_f = \frac{f_M}{f_{Rx}} \quad (59)$$

where $f_{Rx}$ is the polarization rotation frequency at the input of the receiver (introduced in block 404 of the channel model) and $f_M$ is the update frequency of the rotation matrix (applied by block 424). From FIGS. 8B-8D, it can be observed that the described timing recovery technique with $N_{iter}\approx 10$ is able to track channel variations with $r_f>20$ for the example channel having the characteristics of FIG. 8A.

Although the detailed description contains many specifics, these should not be construed as limiting the scope but merely as illustrating different examples and aspects of the described embodiments. It should be appreciated that the scope of the described embodiments includes other embodiments not discussed in detail above. For example, the functionality of the various components and the processes described above can be performed by hardware, firmware, software, and/or combinations thereof.

Various other modifications, changes and variations which will be apparent to those skilled in the art may be made in the arrangement, operation and details of the method and apparatus of the described embodiments disclosed herein without departing from the spirit and scope of the invention as defined in the appended claims. Therefore, the scope of the invention should be determined by the appended claims and their legal equivalents.

The invention claimed is:

1. A receiver for processing a signal received over an optical communication channel, the signal comprising first and second polarization components and the optical communication channel introducing polarization mode dispersion effects into the signal, the receiver comprising:
   an analog front end to sample the signal based on a sampling clock to generate a digital vector representing the first and second polarization components of the signal;
   a matrix transformation block to apply a transformation matrix to the digital vector representing the first and second polarization components to generate a transformed digital vector having an increased timing tone energy relative to the digital vector, wherein the timing tone energy of the transformed digital vector is based on a memoryless nonlinearity of one of a first and second polarization component of the transformed digital vector;
   a timing recovery block to detect a symbol rate of the transformed digital vector and generate the sampling clock based on the detected symbol rate;
   an equalizer to equalize the transformed digital vector using equalizer coefficients that are updated based on estimated channel characteristics;
   a parameter estimator to apply a gradient optimization algorithm to determine updated rotation and phase parameters for the transformation matrix that optimize the timing tone energy based on the equalization parameters of the equalizer; and
   a matrix parameter updater to update the transformation matrix based on the updated rotation and phase parameters.

2. The receiver of claim 1, wherein the parameter estimator determines the updated rotation and phase parameters to maximize the timing tone energy of one of the first and second polarization components of the transformed digital vector when the transformation matrix is applied.

3. The receiver of claim 1, wherein the polarization mode dispersion effects introduced by the optical communication channel comprises a half symbol period differential group delay for at least a portion of the signal, and wherein the timing recovery block generates the sampling clock signal with a non-zero timing tone energy for the portion of the signal having the half symbol period differential group delay.

4. The receiver of claim 1, wherein the equalizer is configured to apply a filter to the transformed digital vector received from the matrix transformation block, the equalizer to compensate for impairments in the optical communication channel, the filter implementing a dynamically updated transfer function based on the equalization parameters.

5. The receiver of claim 4, wherein the equalizer comprises a fractionally-spaced equalizer.

6. The receiver of claim 4, wherein the matrix parameter updater dynamically updates the transformation matrix periodically according to an update frequency.

7. The receiver of claim 1, wherein the matrix transformation block and the timing recovery block are embodied in a digital signal processor in an integrated circuit.

8. The receiver of claim 1, wherein the memoryless nonlinearity comprises a squared magnitude.

9. The receiver of claim 1, wherein the transformation matrix comprises a rotation matrix and wherein the transformed digital vector comprises a rotated digital vector.

10. The receiver of claim 9, wherein the rotation matrix comprises an angle term and at least one phase term.

11. A method for timing recovery in a receiver, the method comprising:
    receiving a signal over an optical communication channel, the signal comprising first and second polarization components and the optical communication channel introducing polarization mode dispersion effects into the signal;
    sampling the signal based on a sampling clock to generate a digital vector representing the first and second polarization components of the signal;
    applying a transformation matrix to the first and second polarization components of the digital vector, the transformation matrix transforming the first and second polarization components of the digital vector to generate a transformed digital vector having increased timing tone energy relative to the digital vector;
    detecting a symbol rate of the transformed digital vector based on a memoryless nonlinearity of one of the first and second polarization components of the transformed digital vector;
    generating the sampling clock based on the detected symbol rate;
    equalizing the transformed digital vector using an equalizer having equalizer coefficients updated based on estimated channel characteristics;
    applying a gradient optimization algorithm to determine updated rotation and phase parameters for the transformation matrix that optimize the timing tone energy based on the equalization parameters of the equalizer; and
    updating the transformation matrix based on the updated rotation and phase parameters.

12. The method of claim 11, wherein determining the updated rotation and phase parameters comprises:
    maximizing the timing tone energy of the transformed digital vector, wherein the timing tone energy is based on the memoryless nonlinearity of one of the first and second polarization components of the transformed digital vector.

13. The method of claim 11, wherein the polarization mode dispersion effects introduced by the optical communication channel comprises a half symbol period differential group delay for at least a portion of the signal, and wherein the sampling clock signal comprises a non-zero timing tone energy for the portion of the signal having the half symbol period differential group delay.

14. The method of claim 11, wherein equalizing the transformed digital vector comprises:
    applying a filter to the transformed digital vector following application of the transformation matrix, the filter to compensate for impairments in the optical communication channel, the filter implementing a dynamically updated transfer function based on the equalization parameters.

15. The method of claim 14, further comprising:
    dynamically updating the transformation matrix periodically according to an update frequency.

16. The method of claim 11, wherein the updated rotation and phase parameters represent a difference in rotation and phase relative to previously applied rotation and phase parameters, wherein updating the transformation matrix comprises:
    generating a relative transformation matrix based on the updated rotation and phase parameters, the relative transformation matrix representing a relative change to apply to the transformation matrix applied in a previous iteration; and generating the transformation matrix for a current iteration based on the relative transformation matrix and the transformation matrix for the previous iteration.

17. The method of claim 11, wherein updating the transformation matrix further comprises:

applying an interpolator to update the transformation matrix in a plurality of incremental steps.

18. The method of claim 11, wherein the memoryless nonlinearity comprises a squared magnitude.

19. The method of claim 11, wherein the transformation matrix comprises a rotation matrix and wherein the transformed digital vector comprises a rotated digital vector.

20. The method of claim 19, wherein the rotation matrix comprises an angle term and at least one phase term.

21. A receiver comprising:

an analog front end to receive a signal representing an optical signal received over an optical channel, the signal comprising a half symbol period differential group delay for at least a portion of the signal, the analog front end to sample the signal based on a sampling clock to generate a digital vector representing first and second polarization components;

a digital signal processor; and a non-transitory computer-readable storage medium storing instructions for timing recovery, the instructions when executed causing the digital signal processor to perform steps including:

applying a transformation matrix to the first and second polarization components of the digital vector, the transformation matrix transforming the first and second polarization components of the digital vector to generate a transformed digital vector having increased timing tone energy relative to the digital vector;

detecting a symbol rate of the transformed digital vector based on a memoryless nonlinearity of one of the first and second polarization components of the transformed digital vector;

generating the sampling clock based on the detected symbol rate;

equalizing the transformed digital vector using an equalizer having equalizer coefficients updated based on estimated channel characteristics;

applying a gradient optimization algorithm to determine updated rotation and phase parameters for the transformation matrix that optimize the timing tone energy based on the equalization parameters of the equalizer; and updating the transformation matrix based on the updated rotation and phase parameters.

22. The receiver of claim 21, wherein the updated rotation and phase parameters represent a difference in rotation and phase relative to previously applied rotation and phase parameters, and wherein updating the transformation matrix comprises:

generating a relative transformation matrix based on the updated rotation and phase parameters, the relative transformation matrix representing a relative change to apply to the transformation matrix applied in a previous iteration; and generating the transformation matrix for a current iteration based on the relative transformation matrix and the transformation matrix for the previous iteration.

23. The receiver of claim 21, wherein updating the transformation matrix further comprises:

applying an interpolator to update the transformation matrix in a plurality of incremental steps.

24. The receiver of claim 21, wherein updating the transformation matrix comprises:

dynamically updating the transformation matrix periodically according to an update frequency.

* * * * *